(12) United States Patent
Arai et al.

(10) Patent No.: US 6,185,167 B1
(45) Date of Patent: Feb. 6, 2001

(54) OPTICAL HEAD AND INFORMATION RECORDING AND REPRODUCTION APPARATUS

(75) Inventors: Akihiro Arai, Souraku-gun; Takao Hayashi, Toyonaka; Tohru Nakamura, Katano; Takayuki Nagata, Hirakata, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/108,009

(22) Filed: Jun. 30, 1998

(30) Foreign Application Priority Data

Jun. 30, 1997 (JP) .................................................. 9-174384

(51) Int. Cl.⁷ ...................................................... G11B 7/00
(52) U.S. Cl. .................................... 369/44.23; 369/44.41; 369/112
(58) Field of Search ................................ 369/44.23, 112, 369/44.37, 44.41, 44.29, 44.35, 44.42

(56) References Cited

U.S. PATENT DOCUMENTS

| 4,908,506 | | 3/1990 | Coops et al. | |
|---|---|---|---|---|
| 5,391,815 | * | 2/1995 | Kurata et al. | 319/44.23 |
| 5,475,670 | * | 12/1995 | Hamada et al. | 369/44.23 |
| 5,608,695 | * | 3/1997 | Yamazaki | 369/44.23 |
| 5,663,940 | * | 9/1997 | Horimai et al. | 369/44.37 |
| 5,953,295 | * | 9/1999 | Nagano | 369/112 |

FOREIGN PATENT DOCUMENTS

| 0562158 A1 | * | 9/1993 | (EP) . |
|---|---|---|---|
| 7-280372 | | 10/1995 | (JP) . |
| 8-306057 | | 11/1996 | (JP) . |

* cited by examiner

*Primary Examiner*—Thang V. Tran
(74) *Attorney, Agent, or Firm*—Ratner & Prestia

(57) ABSTRACT

An optical head is composed of an objective 2, a composite diffraction element 3 having six areas divided by three parting lines 3a to 3c; and a substrate 5 on which a light-emitting element and a plurality of light-receiving elements are arranged. A focus and a tracking error signals are generated based on signals from the light-receiving elements that receive those of a plurality of luminous fluxes divided by the composite diffraction element 3 which result from passage through the portion between the parting lines 3b and 3c. In generating the tracking error signal, signals from the light-receiving elements that receive luminous fluxes resulting from passage through the outside of the parting lines 3b and 3c are used to correct an offset in the tracking error signal caused by the movement of the objective.

29 Claims, 20 Drawing Sheets

(a)

(b)

(a)

(b)

(a)

(b)

(a)

(b)

(a)

(b)

(a)

(b)

(a)

(b)

OPTICAL HEAD AND INFORMATION RECORDING AND REPRODUCTION APPARATUS

BACKGROUND OF THE INVENTION

1. Field of the Invention

The present invention relates to an optical head that optically records information on an information-recording medium such as an optical disc or reproduces or deletes information therefrom, and to an information recording and reproduction apparatus that uses this optical head.

2. Related Art of the Invention

An optical head that uses a push pull signal to generate a tracking error signal is commonly used due to an advantage that it can be implemented in an optical system of a simple configuration. It, however, has a disadvantage that an offset occurs in a tracking error a signal as an objective moves in a tracking direction. A technique that compensates for this disadvantage is disclosed in Japanese Patent Application Laid-Open No. 8-306057 and Japanese Patent Application No. 7-280372.

The conventional techniques are described below with reference to the drawings. FIG. 18 shows a configuration of a first conventional technique that is an optical head in Japanese Patent Application Laid-Open No. 8-306057. In this figure, 74 is the optical axis of the optical head; 75 is a light source; 76 and 77 are half mirrors; 78 is an objective; 79 is an actuator that moves the objective in the X and Y directions; 80 is an optical disc that is an information-recording medium; 81 is a six-piece light-receiving element (In the figure, a sub-figure showing the locational relationship between the element 81 and the optical axis 74 and a sub-figure showing a detection state are shown in parallel); 81a to 81c are parting lines of the six-piece light-receiving element 81; 82a to 82f are divided light-receiving areas; 83 is a differential amplifier that is an operation circuit; 84 is a luminous flux on the six-piece light-receiving element 81; 88 is a focus control section; and 89 is a tracking control section.

Next, the operation of the optical head of the above configuration is described. Light from the light source 75 is reflected by the half mirror 76 and converged by the objective 78 on an information-recording surface of the optical disc 80 to form a light spot. Information tracks are formed on the optical disc 80, and their direction is perpendicular to the sheet of the drawing in FIG. 18. Reflected light from the optical disc 80 is transmitted through the objective 78 and half mirror 76 and separated into two luminous fluxes by the half mirror 77. Luminous fluxes reflected from the half mirror 77 are incident on the focus control section 88, and transmitted luminous fluxes enter the six-piece light-receiving element 81.

An addition provided by the connections in the figure and a differential operation performed by the differential amplifier 83 generate a tracking error signal, which is then guided to the tracking control section 89. The focus control section 88 detects a focus error signal and controls the actuator 79 so that light is converged on the information-recording surface of the optical disc. Based on the detected tracking error signal, the tracking control section 89 controls the actuator 79 in such a way that the light spot is guided to the center of the information tracks, and moves the objective 78 in the X-positive and -negative direction using the optical axis 74 of the optical head as a reference.

FIGS. 19(a) and 19(b) show the position of the luminous flux 84 on the six-piece light-receiving element 81; FIG. 19(a) shows that the objective 78 is located at a reference position, and FIG. 19(b) shows that the objective moves in the X-positive direction. Two shaded parts in the luminous flux 84 show area in which a zero-order diffracted luminous flux and a positive and a negative first order diffracted luminous fluxes, which are diffracted by the optical disc 80, interfere with each other.

In FIG. 19(a), the luminous flux 84 is symmetrical relative to the parting line 81a, so an output signal form the differential amplifier 83 is a tracking error signal without offset. On the other hand, in FIG. 19(b), the luminous flux 84 is moved to the right to lose its symmetry relative to the parting line 81a, and the area of the luminous flux contained in each of areas 82b, 82d and 82f increases while the area of the luminous flux contained in each of areas 82a, 82c, and 82e decreases. When a signal detected in each light-receiving area is represented by its area name and the tracking error signal is referred to as TE, the operation performed by the differential amplifier 83 is as follows:

$$TE=82a+82e+82d-k*(82b+82f+82c) \quad \text{[Equation 3]}$$

wherein (k) is a correction coefficient. A push pull signal component appears in the areas 82c and 82d mainly containing the shaded interfering areas, whereas an offset component appears in the other areas mainly due to the movement of the luminous flux. Thus, by setting the correction coefficient (k) at an appropriate value, the operation in Equation 3 provides a tracking error signal in which an offset is corrected that is caused by the movement of the objective.

Next, a second conventional technique that is the optical head in Japanese Patent Application No. 7-280372 is described. The configuration of this optical head is similar to that of the first conventional technique except for the division of the light-receiving element. Thus, its configuration diagram is omitted and only the configuration of the multi-piece light-receiving element is described.

FIG. 20(a) is a top view of an eight-piece light-receiving element. Reference numerals 85a to 85c designate parting lines of the eight-piece light-receiving element 85; 86a to 86h are divided light-receiving areas; 87 is a luminous flux on the eight-piece light-receiving element 85; and the shaded part in the figure is an area that is not exposed to light.

The operation of the optical head according to the second conventional technique is almost the same as that of the optical head according to the first conventional technique. Thus, the description of the operation is omitted and only the features obtained by configuring the eight-piece light-receiving element as described above are explained. FIG. 20(b) schematically shows the distribution of the amount of light in the luminous flux 87 which is generated when the optical disc is tilted in the radial direction, wherein the magnitude of light intensity is represented by the density of diagonal lines. In this figure, the light intensity increases with increasing density of diagonal lines. This figure indicates that asymmetrical light intensity occurs at the center of the luminous flux due to the inclination of the optical disc in the radial direction, and this asymmetry of the intensity distribution results in an offset in the push pull signal. If a shaded portion is present in the center as shown in FIG. 20(a), the effect of the asymmetrical light intensity shown in FIG. 20(b) can be reduced. When a signal detected in each area is represented by the corresponding area name, the tracking error signal TE can be obtained by the following equation:

$$TE=86c+86e-(86d+86f)-k*\{86a+86g-(86b+86h)\} \quad \text{[Equation 4]}$$

wherein (k) is a correction coefficient.

As described above, the first conventional technique can correct an offset in the tracking signal caused by the movement of the objective in the tracking direction, and the second conventional technique can reduce an offset in the tracking signal caused by the inclination of the optical disc in the radial direction.

The conventional techniques, however, divide a luminous flux on the light-receiving element to detect a possible tracking error, so separate optical systems are required to detect a focus and a tracking error signals. Consequently, despite the simple configuration of the detecting optical system of a tracking error, it is difficult to miniaturize or integrate the optical head.

SUMMARY OF THE INVENTION

The first aspect of the present invention is an optical head comprising:
 a light-emitting element;
 a plurality of light-receiving elements;
 an objective that converges light from said light-emitting element on a surface of an information-recording medium;
 a composite diffraction element located in an optical path between said light-emitting element and said objective to spatially divide a luminous flux into a plurality of luminous fluxes in order to guide the plurality of luminous fluxes to said plurality of light-receiving elements, said luminous flux being reflected by said information-recording medium and again passing through said objective; and
 a signal generation means for generating a focus error signal and a tracking error signal based on part or all of the signals detected from said plurality of light-receiving elements, wherein:
 during said generation of said tracking error signal, an offset in a tracking signal is corrected that may be caused by the movement of said objective or the inclination of the surface of said information-recording medium.

A still further aspect of the present invention is an optical head according to the first invention; wherein said composite diffraction element has six areas divided by a first parting line substantially parallel to the direction of information tracks of said information-recording medium and a second and a third parting lines substantially orthogonal to the first parting line and substantially symmetrical relative to the optical axis of said objective, and wherein:
 said signal generation means (1) generates said focus error and tracking error signals based on the detection signals from said light-receiving elements for the plurality of luminous fluxes resulting from passage through those two of said six areas, said two areas being located between said second and third parting lines and (2) generates an offset correction signal that corrects an offset in the tracking error signal caused by the movement of said objective, based on the detection signals from said light-receiving elements for the plurality of luminous fluxes resulting from passage through those four of said six areas, said four areas being located outside said second and third parting lines, in order to use said generated offset correction signal in generating said tracking error signal.

A still further aspect of the present invention is an optical head according to the third invention; wherein said two areas between said second and third parting lines are each formed of a diffraction grating pattern so that luminous fluxes passing through these two areas are divided into four luminous fluxes as positive and negative first order diffracted beams, and wherein:
 said signal generation means generates said focus error signal based on detection signals from said light-receiving elements that receive two of these four luminous fluxes while generating said tracking error signal based on detection signals from said light-receiving elements that receive the two other luminous fluxes.

Another aspect of the present invention is an optical head; wherein said composite diffraction element has eight areas divided by a first parting line substantially parallel to the direction of information tracks of said information-recording medium, a second and a third parting lines substantially orthogonal to the first parting line and substantially symmetrical relative to the optical axis of said objective, and a fourth parting line parallel to the second and third parting lines and located at an equal distance from them, and wherein:
 said signal generation means (1) generates said focus error and tracking error signals based on detection signals from said light-receiving elements for luminous fluxes resulting from passage through those four of said eight areas, said four areas being located between said second and third parting lines and (2) generates an offset correction signal that corrects an offset in the tracking error signal caused by the movement of said objective, based on detection signals from said light-receiving elements for luminous fluxes resulting from passage through those four of said eight areas, said four areas being located outside said second and third parting lines, in order to use said generated offset correction signal in generating said tracking error signal.

Still another aspect of the present invention is an optical head; wherein said four areas between said second and third parting lines are each formed of a diffraction grating pattern so that luminous fluxes passing through these four areas is divided into eight luminous fluxes as positive and negative first order diffracted beams, and wherein:
 said signal generation means generates said focus error signal based on detection signals from said light-receiving elements that receive four of the eight luminous fluxes while generating said tracking error signal based on detection signals from said light-receiving elements that receive the four other luminous fluxes.

A further aspect of the present invention is an optical head; wherein in addition to said four areas between said second and third parting lines, said composite diffraction element has two areas divided by said fourth parting line and a fifth and a sixth parting lines symmetrical relative to said fourth parting line, and wherein:
 the diffraction grating patterns inside the areas between said fifth and sixth parting lines are formed and said light-receiving elements are located so that:
 a plurality of luminous fluxes resulting from passage through said two areas are received by the light-receiving elements that detect said focus error signal but not received by the light-receiving elements for generating said tracking error signal.

A still further aspect of the present invention is an optical head; wherein in addition to said four areas between said second and third parting lines, said composite diffraction element has two areas divided by said fourth parting line and a fifth and a sixth parting lines symmetrical relative to said fourth parting line, and wherein:
 the diffraction grating patterns inside the two areas between said fifth and sixth parting lines are configured so that luminous fluxes resulting from passage through the areas between said fourth and fifth parting lines and luminous fluxes resulting from passage through the areas between said fourth and sixth parting lines are evenly received by a pair of light-receiving elements to detect a push pull signal.

A luminous flux that has passed the area may be allowed to be evenly incident on a pair of light-receiving elements that detect a push pull signal, which is then subjected to an offset by the differential operation.

Another aspect of the present invention is an optical head; wherein the two areas between said second and third parting lines each have a plurality of band-like divisions, wherein:

(1) a set of the band-like divisions alternately arranged in one of said two areas is designated as a first assembly of band-like divisions, while a set of the remaining band-like divisions is designated as a second assembly of band-like divisions, and (2) a set of the band-like divisions alternately arranged in the other area is designated as a third assembly of band-like divisions, while a set of the remaining band-like divisions is designated as a fourth assembly of band-like divisions, wherein:

said plurality of light-receiving elements include a first and a second three-piece light-receiving elements that each receive diffracted beams from the first to fourth assemblies of band-like divisions and a third to a sixth light-receiving elements, wherein:

the diffraction grating patterns inside the areas of said first and fourth assemblies of band-like divisions are formed so that:

(1) a luminous flux passing through said first assembly of band-like divisions is divided into two luminous fluxes as a positive and a negative first order diffracted beams, while a luminous flux passing through said fourth assembly of band-like divisions is divided into two luminous fluxes as a positive and a negative first order diffracted beams and so that:

(2) (a) one of the two luminous fluxes passing through said first assembly of band-like divisions and one of the two luminous fluxes passing through said fourth assembly of band-like divisions are incident on said first three-piece light-receiving element at different positions, while (b) the other of the two luminous fluxes passing through said first assembly of band-like divisions is incident on said third light-receiving element and (c) the other of the two luminous fluxes passing through said fourth assembly of band-like divisions is incident on said fourth light-receiving element, wherein:

the diffraction grating patterns inside the areas of said second and third assemblies of band-like divisions are formed so that:

(3) a luminous flux passing through said second assembly of band-like divisions is divided into two luminous fluxes as a positive and a negative first order diffracted beams, while a luminous flux passing through said third assembly of band-like divisions is divided into two luminous fluxes as a positive and a negative first order diffracted beams and so that:

(4) (a) one of the two luminous fluxes passing through said second assembly of band-like divisions and one of the two luminous fluxes passing through said fourth assembly of band-like divisions are incident on said second three-piece light-receiving element at different positions, while (b) the other of the two luminous fluxes passing through said second assembly of band-like divisions is incident on said fifth light-receiving element and (c) the other of the two luminous fluxes passing through said third assembly of band-like divisions is incident on said sixth light-receiving element, wherein:

said focus error signal is generated based on detection signals detected from said first and second three-piece light-receiving elements, while said tracking error signal is generated based on detection signals detected from said third to sixth light-receiving elements, and wherein:

based on signals detected on receiving diffracted beams from the four areas outside the second and third parting lines of said composite diffraction element, the offset correction signal is generated that corrects an offset in the tracking error signal caused by the movement of said objective.

Still another aspect of the present invention is an optical head; wherein an area sandwiched by the fifth and sixth parting lines substantially parallel to said second and third parting lines is provided between said second and third parting lines at a position at which said assemblies of band-like divisions are divided, wherein:

the area sandwiched by said fifth and sixth parting lines has a plurality of assemblies of band-like divisions in which a set of the alternately arranged band-like divisions is designated as a fifth assembly of band-like divisions while a set of the remaining band-like divisions is designated as a sixth assembly of band-like divisions, and wherein:

the light-receiving elements and the diffraction grating patterns inside the areas of said fifth and sixth assemblies of band-like divisions are configured so that luminous fluxes resulting from passage through said fifth and sixth assemblies of band-like divisions are received by the light-receiving elements that detect said focus error signal but not received by the light-receiving elements for generating said tracking error signal.

A luminous flux that has passed the area may be allowed to be evenly incident on a pair of light-receiving elements that detect a push pull signal, which is then subjected to an offset by the differential operation.

A further aspect of the present invention is an optical head; wherein when the diameter of a passing luminous flux is designated as D, the numerical aperture of an objective on said information-recording medium side is designated as NA, the wavelength is designated as $\lambda$, the pitch of information tracks is designated as d, and the interval between the second and third parting lines is designated as V, the luminous-flux division in said composite diffraction element meets the following equation:

$$0.8\sqrt{1-\frac{1}{4}\left(\frac{\lambda}{NA \times d}\right)^2} < \frac{V}{D} < 1.2\sqrt{1-\frac{1}{4}\left(\frac{\lambda}{NA \times d}\right)^2} \qquad \text{[Equation 1]}$$

A still further aspect of the present invention is an optical head; wherein when the interval between said fifth and sixth parting lines is designated as W, the numerical aperture of an objective on said information medium side is designated as NA, the wavelength is designated as $\lambda$, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA\times d}\right)^2} < \frac{W}{D} < 0.5\sqrt{1-\frac{1}{4}\left(\frac{\lambda}{NA\times d}\right)^2} \quad \text{[Equation 2]}$$

Still another aspect of the invention is an information recording and reproduction apparatus comprising:

an optical head according to a control circuit that provides control based on a signal from the optical head; and a drive section for executing mechanical driving based on a control signal from the control circuit.

By locating a light-emitting element and a plurality of light-receiving elements on the same substrate and integrally fixing a composite diffraction element to the substrate with a predetermined interval provided from the substrate, the signal-detecting optical system of either of the above optical heads may be integrated.

Figure 1:
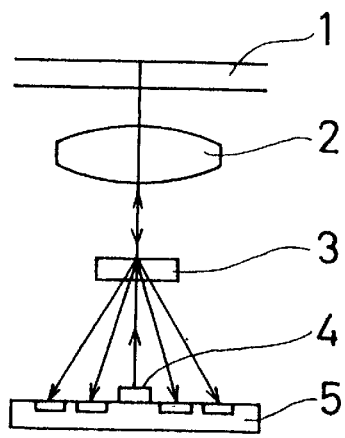
FIG. 1(a) shows a configuration of an optical head according to a first embodiment of this invention.
FIG. 1(b) is a top view describing the concept of a composite diffraction element according to this embodiment.
FIG. 1(c) is a top view showing a layout of light-emitting and light-receiving elements according to this embodiment.
Figure 1:
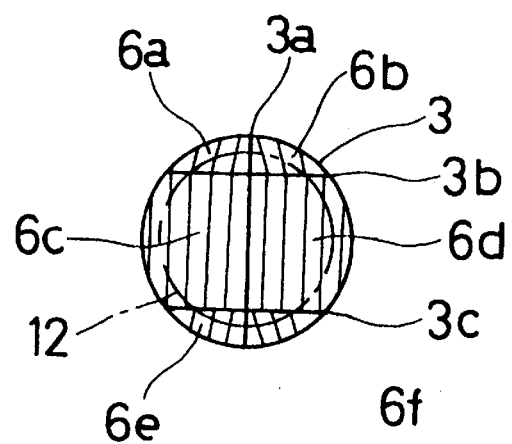
Figure 1:
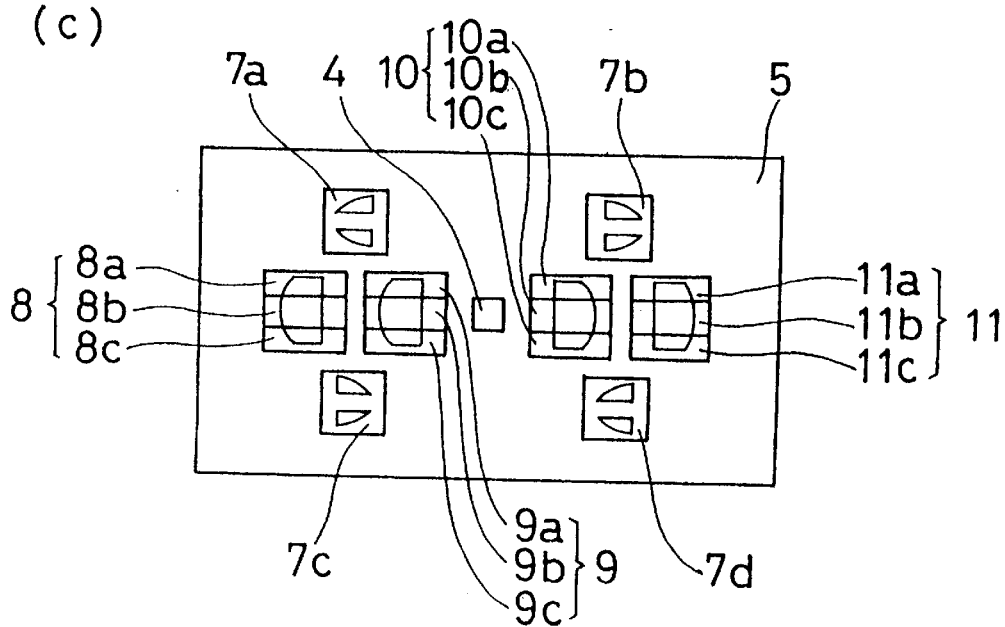

REFERENCE NUMERALS 1, 80: Optical discs
2, 78: Objectives
3, 13, 71: Composite diffraction elements
3a to 3c, 13a to 13c, 21a to 21d, 29a to 29c, 38a to 38f, 47a to 47f, 55a to 55e: Area parting lines for a composite diffraction element
4: Light-emitting element
5, 14, 22, 30, 39, 48, 56, 65, 72: Substrates on which light-emitting and light-receiving elements are arranged.
6a to 6f, 15a to 15f, 23a to 23h, 31a to 31d, 32a to 32d, 40a to 40h, 41a to 41b, 49a to 49h, 57a to 57d, 58a to 58g, 59a to 59d: Divided areas of a composite diffraction element
7a to 7d, 16a to 16d, 24a to 24d, 33a to 33d, 42a to 42d, 50a to 50d, 60a to 60d, 66a to 66d: Light-receiving elements
8 to 11, 17 to 20, 34, 36, 44, 46, 61, 62, 67, 68: Three-piece light-receiving elements
25 to 28, 35, 37, 43, 45, 51 to 54, 63, 64, 69, 70: Two-piece light-receiving elements
12: Appearance of a luminous flux on the composite diffraction element
73: Fixing member
74: Optical axis
79: Actuator
76, 77: Half mirrors
81: Six-piece light-receiving element
82a to 83f: Light-receiving areas of the six-piece light-receiving element 83: Differential amplifier
84: Appearance of a luminous flux on the six-piece light-receiving element
85: Eight-piece light-receiving element
86a to 86h: Light-receiving areas of the eight-piece light-receiving element
87: Appearance of a luminous flux on the eight-piece light-receiving element
101: Substrate on which light-emitting and light-receiving elements are arranged
102a to 102d: Light-receiving elements
103, 104: Three-piece light-receiving elements
105, 106: Two-piece light-receiving elements
107a to 107f: Parting lines of a composite diffraction element
108a to 108d: Divided areas of the composite diffraction element

DESCRIPTION OF THE PREFERRED EMBODIMENTS

Embodiments of this invention are described below with reference to the drawings.

First Embodiment

FIG. 1(a) shows a configuration of an optical head according to a first embodiment of this invention. FIG. 1(b) is a conceptual drawing of a top surface of a composite diffraction element. FIG. 1(c) is a top view showing a layout of light-emitting and light-receiving elements.

In FIG. 1(a), 1 is an optical disc that is an information-recording medium; 2 is an objective; 3 is a composite diffraction element; 4 is a light-emitting element, for example, a semiconductor laser; and 5 is a substrate that is integrated with the light-emitting element 4 and on which light-receiving elements are arranged. Each arrow in the figure shows the direction in which light advances. FIG. 1(b) is a top view of the composite diffraction element 3. In this figure, 3a to 3c are area parting lines; 6a to 6f are divided areas wherein the stripes in the areas conceptually show the direction of the diffraction grating; and 12 indicates the appearance of a luminous flux passing through the composite diffraction element 3. FIG. 1(c) is a top view of the substrate 5. In this figure, 7a to 7d are unitary light-receiving elements; 8 to 11 are three-piece light-receiving elements; and 8a to 8c, 9a to 9c, 10a to 10c, and 11a to 11c are light-receiving areas each constituting the three-piece light-receiving element. The graphics shown inside each light-receiving element schematically show the shape of a luminous flux incident on the element.

Figure 14:
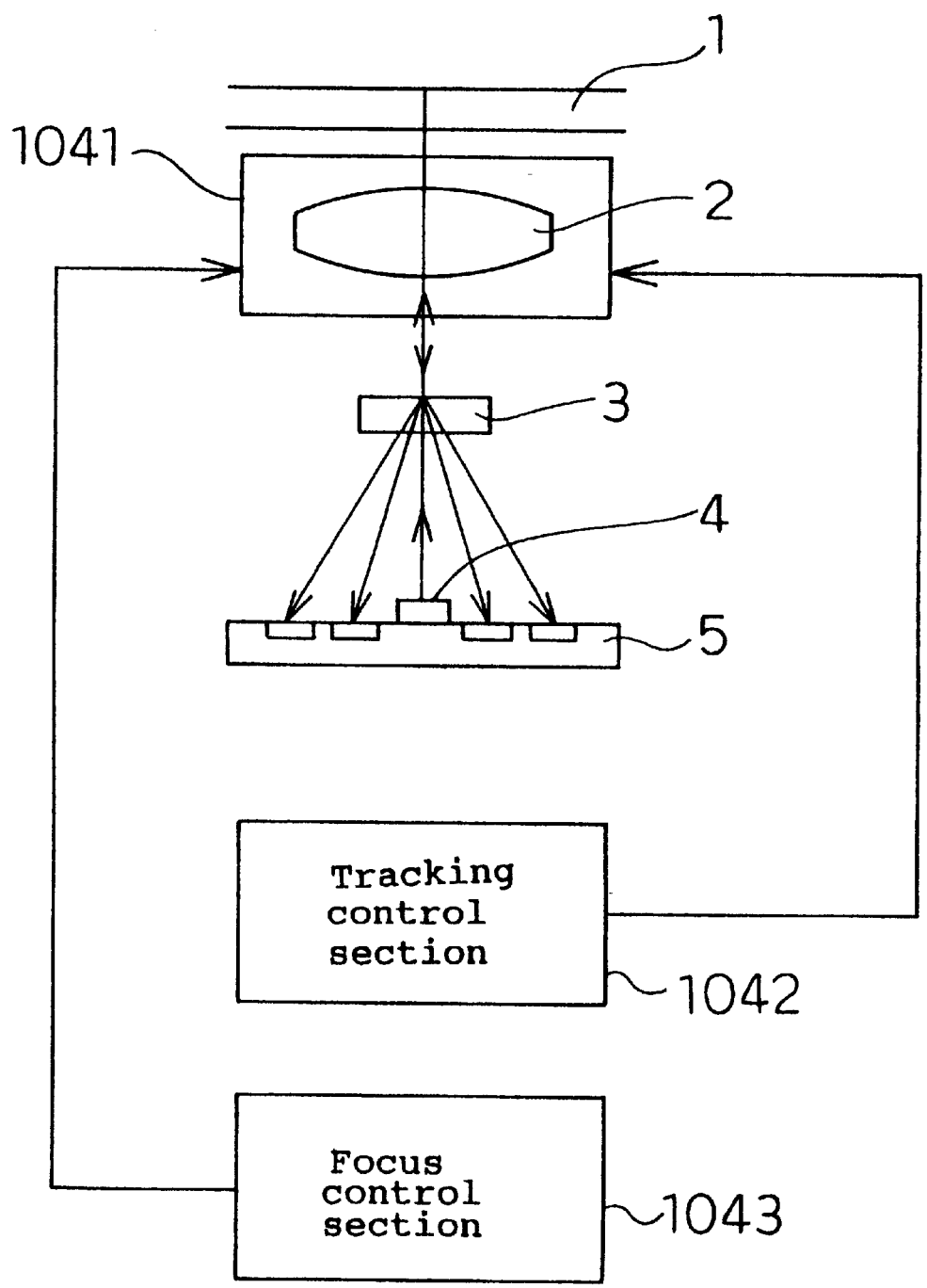
FIG. 14 shows a schematic configuration of the optical head according to the first embodiment of this invention.
Figure 15:
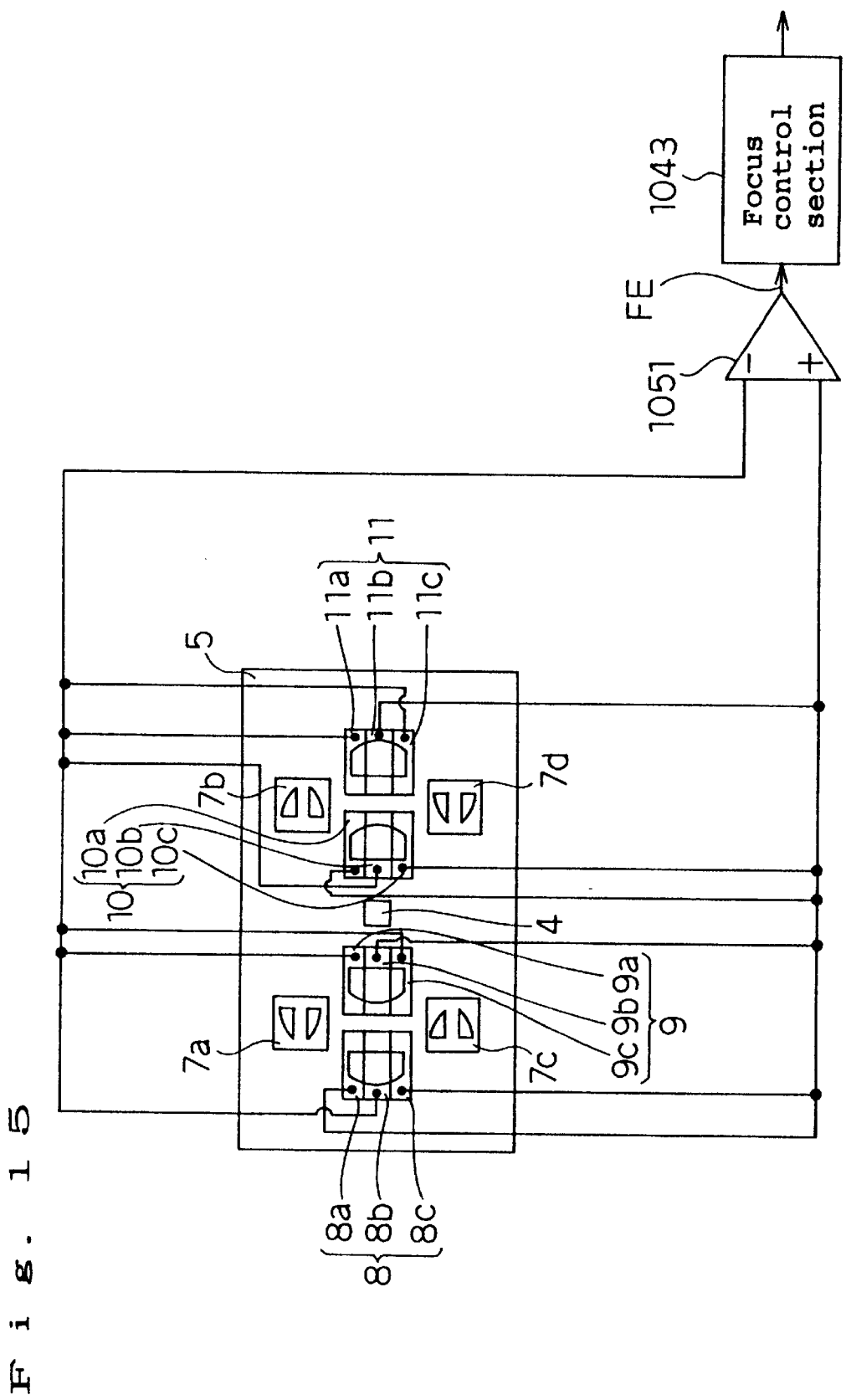
FIG. 15 is a schematic circuit diagram of a circuit that generates a focus error signal according to the first embodiment of this invention.
Figure 16:
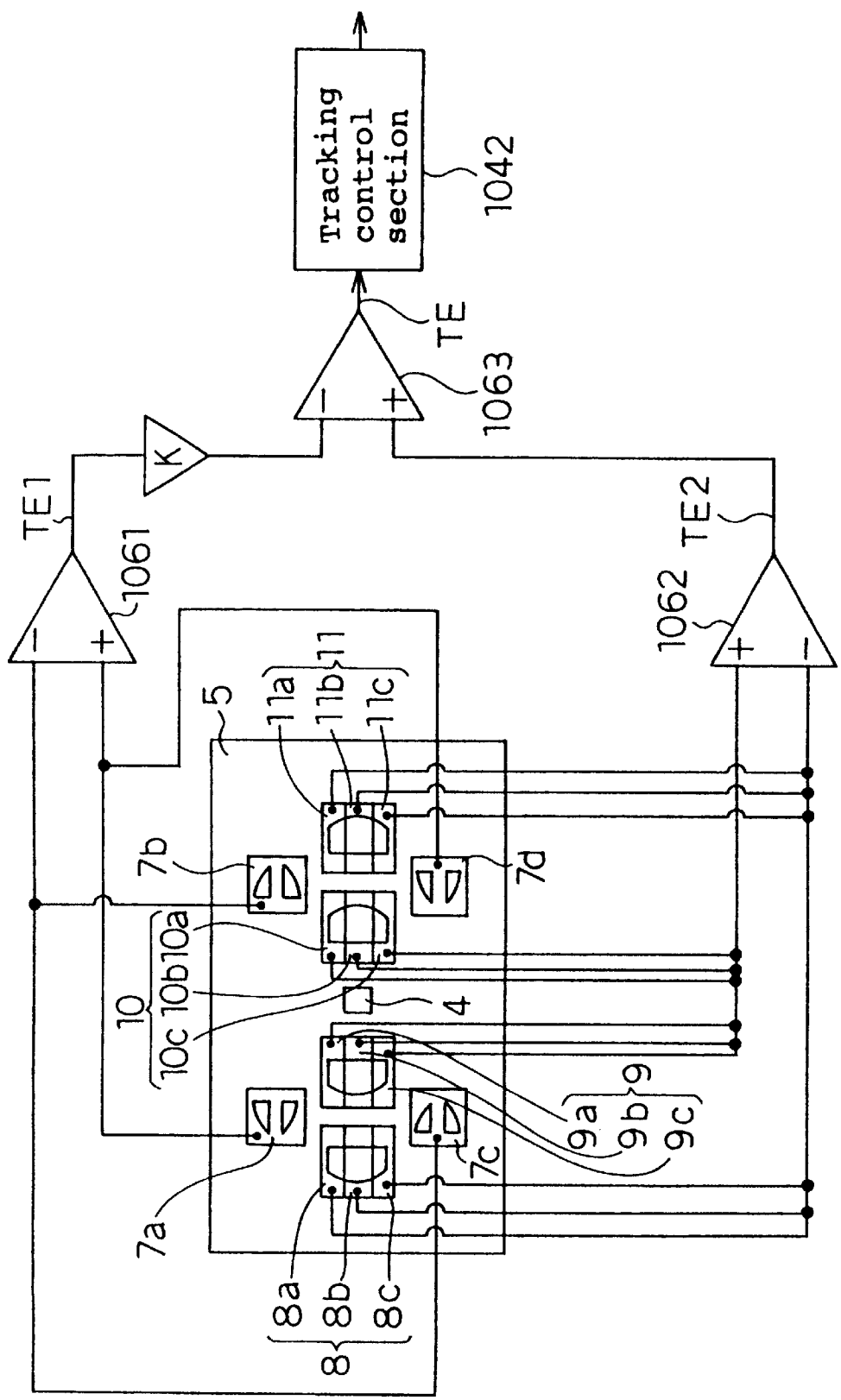
FIG. 16 is a schematic circuit diagram of a circuit that generates a tracking error signal according to the first embodiment of this invention.

The optical head according to this invention has a signal generation means, a focus control section, a tracking control section, which are all described in detail in FIGS. 14 to 16.

FIG. 14 is a schematic drawing describing a configuration of a control section of the optical head according to this embodiment. FIG. 15 is a connection diagram of a circuit that generates a focus error signal that is input to the focus control section shown in FIG. 14. FIG. 16 shows a circuit diagram of a circuit that generates a tracking error signal that is input to the tracking control section shown in FIG. 14.

Figure 18:
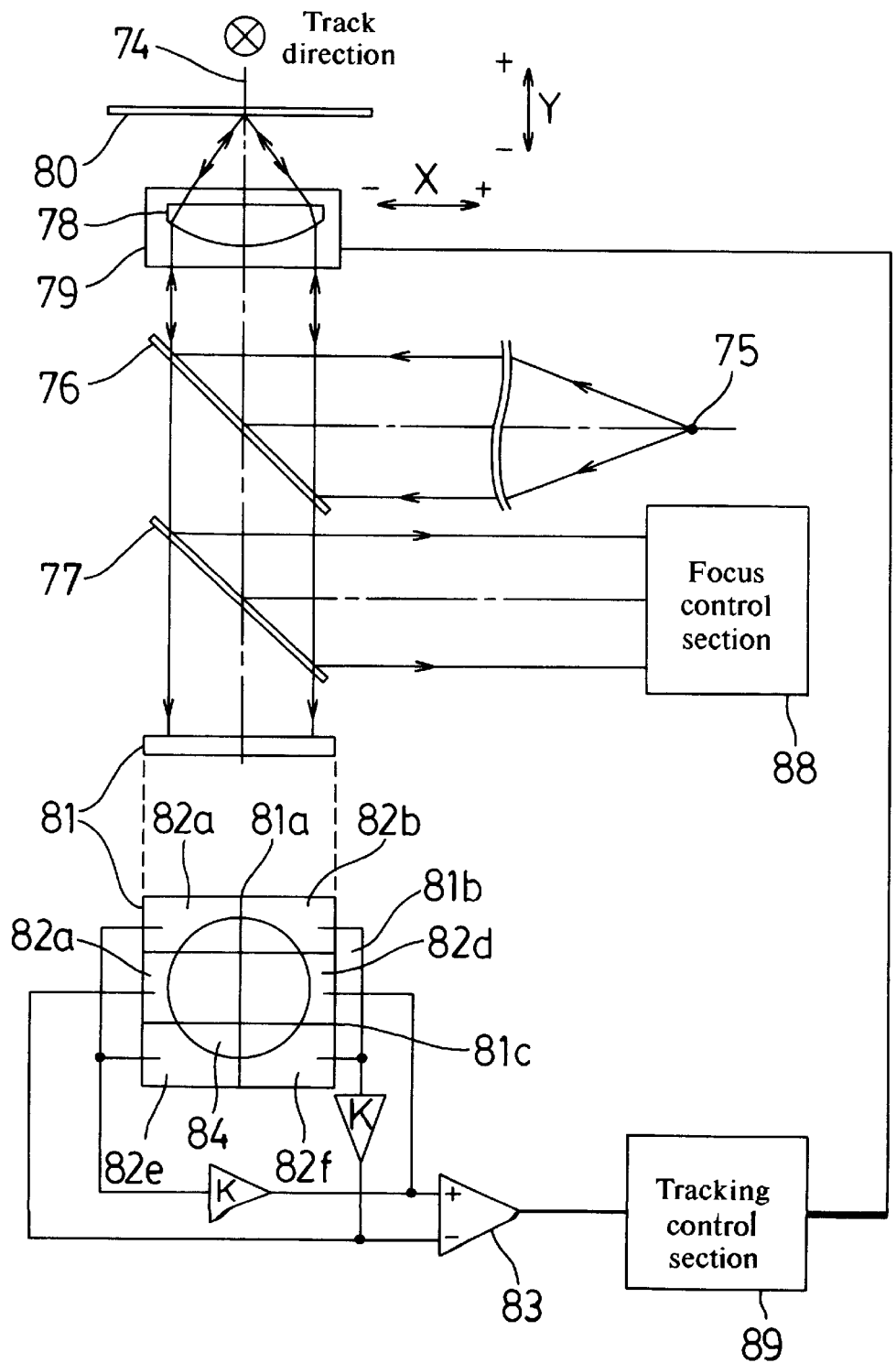
FIG. 18 shows a configuration of a conventional optical head.

In FIG. 14, an actuator 1041 is a means for moving the objective 2 in the X and Y directions. In addition, a tracking control section 1042 is a means for using a tracking error signal to control the actuator 1041 80 as to guide a light spot to the center of information tracks, and basically has the same configuration as the tracking control section 89 described in FIG. 18. In addition, a focus control section 1043 is a means for using a focus error signal to control the actuator 1041 so as to converge light on an information-recording surface of the optical disc 1.

A first parting line according to this invention corresponds to a parting line 3a, and a second and a third parting lines according to this invention similarly correspond to parting lines 3b and 3c.

Next, the operation of the optical head of the above configuration is described. Light emitted by the light-emitting element 4 is transmitted through the composite diffraction element 3 and converged by the objective 2 on the information-recording surface of the optical disc 1. Information tracks are formed on the information-recording surface of the optical disc 1 and extend perpendicularly to the sheet of the drawing in FIG. 1(a). After passing through the objective 2, reflected light from the optical disc 1 advances to the neighborhood of the light-emitting element 4 while converging and is then incident on the composite diffraction element 3. After passing through the areas of the composite diffraction element 3 divided by the parting lines 3a to 3c, the luminous flux is transmitted as a positive first order, a zero order, and a negative first order diffracted beams. Of the transmitted beams, the positive and negative first order diffracted beams travel toward the corresponding light-receiving elements.

Diffracted beams through the areas 6a and 6e of the composite diffraction element 3 are incident on, for example, light-receiving elements 7a and 7d, diffracted beams through the areas 6b and 6f of the composite diffraction element 3 are incident on, for example, the light-receiving elements 7b and 7c, a diffracted beam through the area 6c is incident on, for example, the three-piece light-receiving elements 9 and 10, and a diffracted beam through the area 6d is incident on, for example, the three-piece light-receiving elements 8 and 11. In this case, when the diffraction grating patterns in the areas 6c and 6d of the composite diffraction element 3 have refracting power such as that of a lens in such a way that, for example, the luminous fluxes incident on the three-piece light-receiving elements 9 and 11 converge into a focus at points further than these light-receiving elements, while the luminous fluxes incident on the three-piece light-receiving elements 8 and 10 converge into a focus at points nearer to the composite diffraction element 3 than these light-receiving elements and that when the optical disc 1 is placed at the focal point of the objective 2, the lengths of the luminous fluxes on the three-piece light-receiving elements 8, 9, 10, and 11 are substantially equal in the direction orthogonal to the parting lines of these light-receiving elements, then the magnitudes of the luminous fluxes on the three-piece light-receiving elements change to different values depending on the offset of the focal point of the objective 2. Thus, a focus error signal FE is obtained by the following operation:

$$FE = 9b+11b+8a+8c+10a+10c-(9a+9c+11a+11c+8b+10b) \quad \text{[Equation 7]}$$

A connection diagram of connections for realizing this operation is shown in FIG. 15. An addition provided by the connection shown in this figure and a differential operation performed by a differential amplifier 1051 generate a focus error signal FE, which is then guided to the focus control section 1043.

In addition, a signal TE1 for correcting a tracking offset caused by the movement of the objective 2 in the direction orthogonal to the information tracks is obtained by the following equation by detecting luminous fluxes passing through the areas outside the area parting lines 3b and 3c of the composite diffraction element 3 based on the luminous-flux division of the above conventional technique:

$$TE1=7a+7d-(7b+7c) \quad \text{[Equation 8]}$$

A push pull signal TE2 is obtained by the following equation by detecting a luminous flux passing through the area between the area parting lines 3b and 3c of the composite diffraction element 3:

$$TE2=(9a+9b+9c+10a+10b+10c)-(8a+8b+8c+11a+11b+11c) \quad \text{[Equation 9]}$$

Thus, a tracking error signal TE in which an offset is corrected that is caused by the movement of the objective 2 is expressed as follows:

$$TE=TE2-k*TE1 \quad \text{[Equation 10]}$$

wherein (k) is a correction coefficient. In the above four equations, the detection signal names are represented by the light-receiving area names.

A connection diagram of connections for realizing the above operations is shown in FIG. 16. An addition provided by the connections shown in this figure and a differential operation performed by differential amplifiers 1061 and 1062 generate the tracking offset correction signal TE1 and push pull signal TE2. These signals are input to a differential amplifier 1063 to perform a differential operation as described above. In this manner, the differential amplifier 1063 generates the tracking error signal TE, which is then guided to the tracking control section 1042.

In this configuration, when the interval between the parting lines 3b and 3c of the composite diffraction element 3 is designated as V, the numerical aperture of the objective on the optical-disc side is denoted as NA, the wavelength is indicated as λ, the pitch of the information tracks is referred to as (d), and the diameter of a luminous flux passing through the composite diffraction element 3 is denoted as D, the following equation is desirably met:

$$0.8\sqrt{1-\frac{1}{4}\left(\frac{\lambda}{NA \times d}\right)^2} < \frac{V}{D} < 1.2\sqrt{1-\frac{1}{4}\left(\frac{\lambda}{NA \times d}\right)^2} \quad \text{[Equation 11]}$$

Figure 19A:
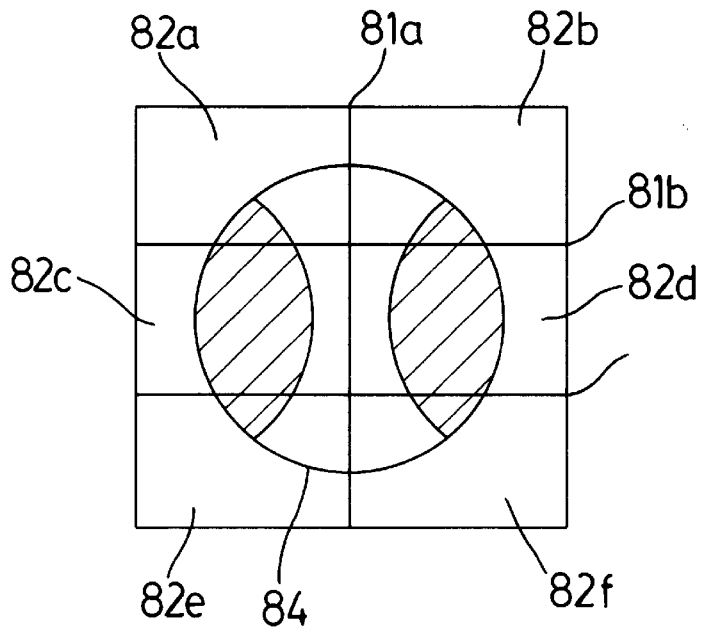
FIG. 19(a) describes a method for dividing a light-receiving element according to a first conventional technique wherein an objective is placed at a reference position, FIG. 19(b) describes a method for dividing a light-receiving element according to the first conventional technique wherein the objective is moved to the X-positive direction.
Figure 19B:
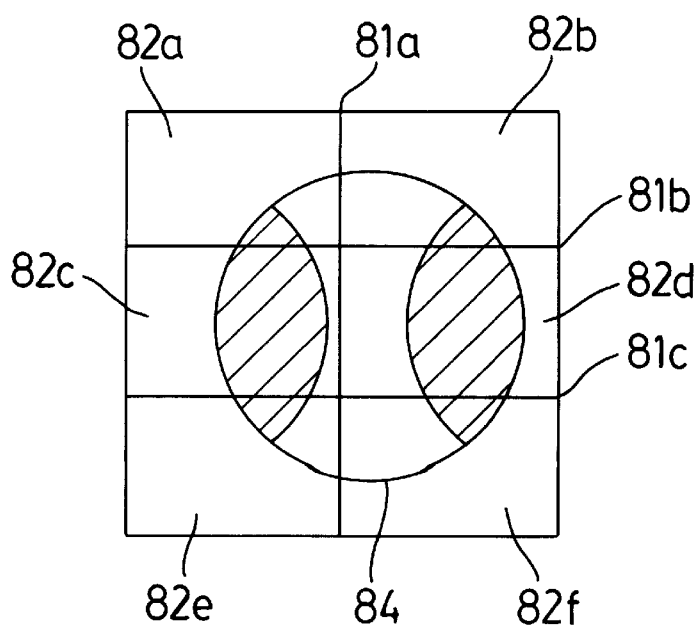
Figure 20A:
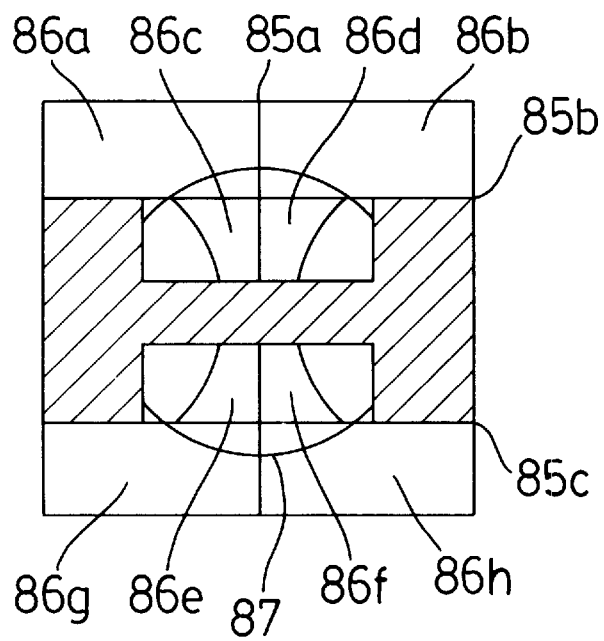
FIG. 20(a) is a top view of an eight-piece light-receiving element describing a method for dividing a light-receiving element according to a second conventional technique, FIG. 20(b) schematically shows the distribution of the amount of light in a luminous flux obtained when an optical disc is tilted in the radial direction in the light-receiving element shown in FIG. 20(a).
Figure 20B:
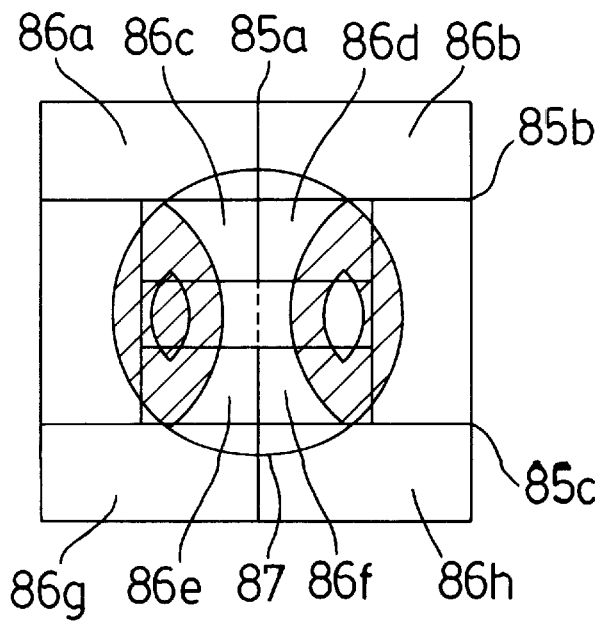

The reason is explained with reference to FIG. 19(a). The area parting lines 3a to 3c of the composite diffraction element 3 correspond to the parting lines 81a to 81c in FIG. 19(a). In this figure, the shaded part represents an area in which the positive and negative first order diffracted beams diffracted by the information tracks of the optical disc interfere with the zero order diffracted beam, and this area contains push pull signal components. Meeting Equation 11 means that the amount of shaded area mixed into the area outside the parting lines 81b and 81c is limited and that an amount of detection signal is obtained that is sufficient to correct an offset in the tracking signal. Conversely, if Equation 11 is not met, the amount of correction signal TE1 is too small to provide sufficient corrections or the amount of push pull signal mixed into the correction signal TE1 increases to reduce the amplitude of the signal TE based on the operation in Equation 10.

The optical head configured as described above has a means for correcting an offset in the tracking error signal caused by the movement of the objective and allows the same detecting optical system to detect the focus and tracking error signals. Furthermore, these features are realized by the two optical parts, that is, the composite diffraction element and the substrate on which the light-emitting and light-receiving elements are arranged, thereby reducing the size of the optical head.

Although this embodiment generates a focus error signal based on signals from the four three-piece light-receiving elements that receive four luminous fluxes diffracted by the areas 6c and 6d, it is not limited to this aspect but the focus error signal can be generated based on signals from, for example, two three-piece light-receiving elements.

As described above, the focus error signal varies with the length of a luminous flux in the direction perpendicular to the parting lines of the three-piece light-receiving element, so a focus error signal can be obtained based on the following Equation 53 using, for example, a detection signal obtained at the three-piece light-receiving element 9 on which a luminous flux is incident and then converges into a focus at a point further than the light-receiving element and a detection signal obtained at the three-piece light-receiving element 10 on which a luminous flux is incident and then converges into a focus at a point nearer to the composite diffraction element than the light-receiving element:

$$FE=9b+10a+10c-(9a+9c+10b) \quad \text{[Equation 53]}$$

With respect to the combination of two of the four three-piece light-receiving elements, different combinations are possible as long as one of the focal points of luminous fluxes incident on the respective light-receiving elements is near that light-receiving element whereas the other is far from the light-receiving element.

Second Embodiment

Figure 2A:
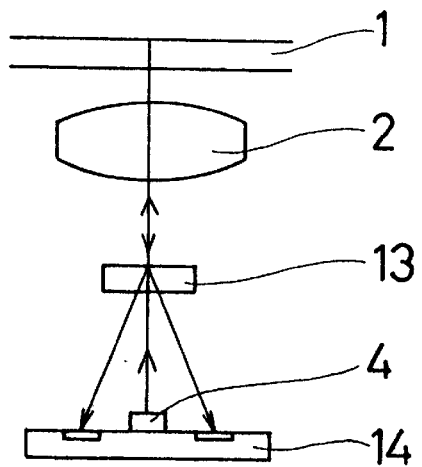
FIG. 2(a) shows a configuration of an optical head according to a second embodiment of this invention.
Figure 2B:
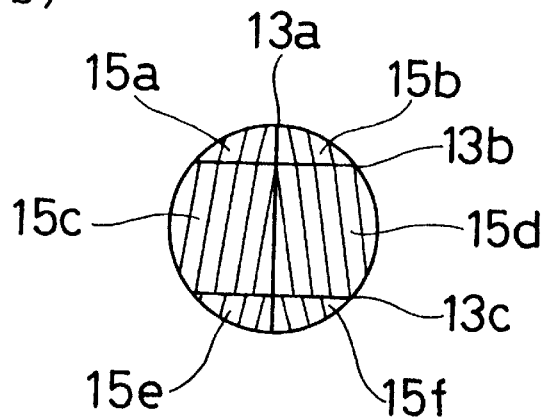
FIG. 2(b) is a top view describing the concept of a composite diffraction element according to this embodiment.
Figure 2C:
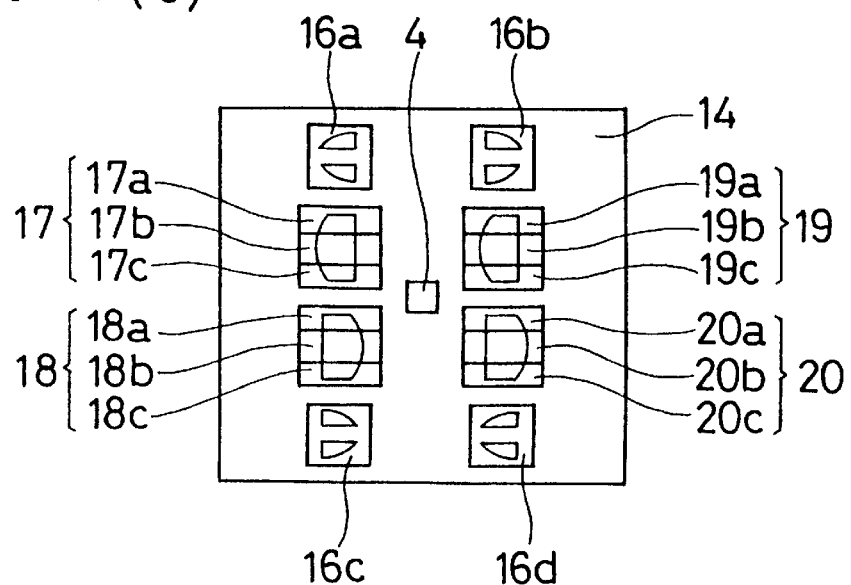
FIG. 2(c) is a top view showing a layout of light-emitting and light-receiving elements according to this embodiment.

FIG. 2(a) shows a configuration of an optical head according to a second embodiment of this invention. FIG. 2(b) is a conceptual drawing of a top surface of a composite diffraction element. FIG. 2(c) is a top view showing a layout of light-emitting and light-receiving elements. The configuration of this optical head is similar to that in the first embodiment, so the same components have the same reference numerals and their description is omitted. Only those components that are different from those of the first embodiment are described in terms of their configuration.

Figure 13:
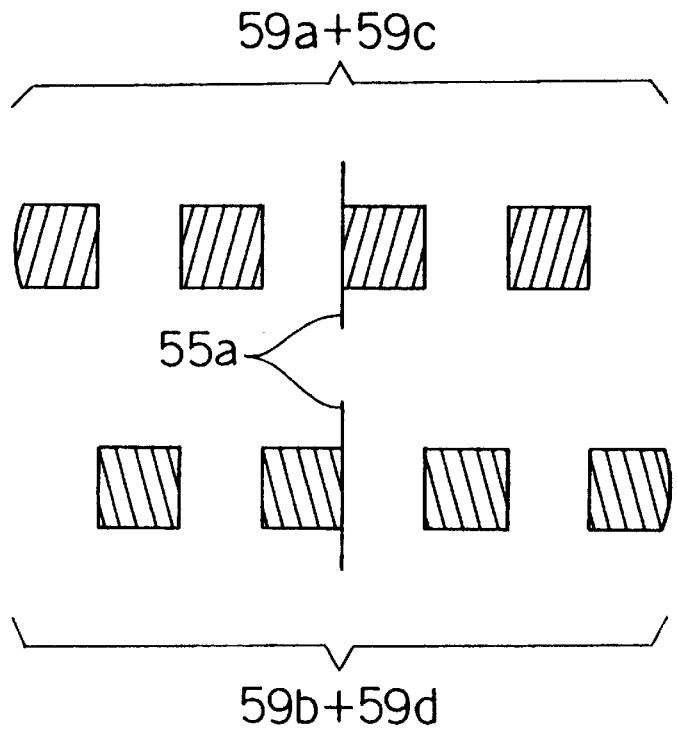
FIG. 13(a) is a conceptual drawing showing a composite diffraction element composed of an assembly of band-like divisions in which the divisions are loosely assembled together, FIG. 13(b) describes an assembly of band-like divisions in which the divisions are arranged without a gap in the direction perpendicular to a parting line 107a according to the twelfth embodiment.
Figure 13:
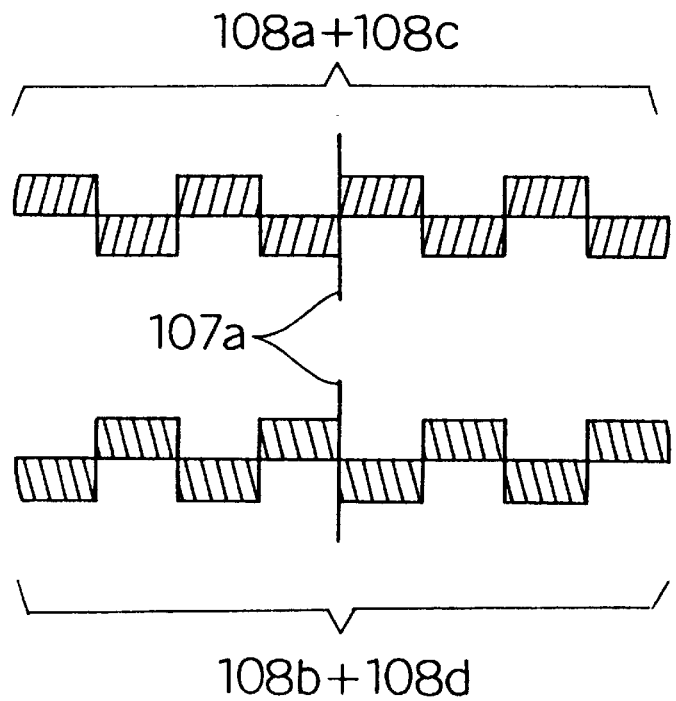

In FIG. 2(a), 13 is a composite diffraction element and 14 is a substrate that is integrated with the light-emitting element 4 and on which light-receiving elements are arranged. In FIG. 2(b), 13a to 13c are area parting lines of the composite diffraction element 13; and 15a to 15f are divided areas wherein the stripes in the areas conceptually show the direction of the diffraction grating. FIG. 2(c) is a top view of the substrate 14, wherein 16a to 16d are unitary light-receiving elements; 17 to 20 are three-piece light-receiving elements; and 17a to 17c, 18a to 18c, 19a to 19c, and 20a to 20c are light-receiving areas each constituting the three-piece light-receiving element. The graphics shown inside each light-receiving element schematically show the shape of a luminous flux incident on the element.

The operation of the optical head of the above configuration is described below. Since it also has many characteristics in common with the first embodiment, only different features are explained. A luminous flux reflected by the optical disc 1 and again entering the composite diffraction element 3 is divided into a positive and a negative first order diffracted beams through the areas divided by the three parting lines 13a to 13c, and the diffracted beams travel toward the corresponding light-receiving elements.

Diffracted beams through the areas 15a and 15c of the composite diffraction element 13 are incident on, for example, the light-receiving elements 16a and 16d, diffracted beams through the areas 15b and 15f are incident on, for example, the light-receiving elements 16b and 16c, a diffracted beam through the area 15c is incident on, for example, the three-piece light-receiving elements 17 and 20, and a diffracted beam through the area 15d is incident on, for example, the three-piece light-receiving elements 18 and 19. In this case, when the diffraction grating patterns in the areas 15c and 15d have refracting power such as that of a lens in such a way that, for example, the luminous fluxes incident on the three-piece light-receiving elements 17 and 18 converge into a focus at points further than these light-receiving elements, while the luminous fluxes incident on the three-piece light-receiving elements 19 and 20 converge into a focus at points nearer to the composite diffraction element 13 than these light-receiving elements and that when the optical disc 1 is placed at the focal point of the objective 2, the magnitudes of the luminous fluxes on the three-piece light-receiving elements 17, 18, 19, and 20 are substantially equal in the direction orthogonal to the parting lines of these light-receiving elements, then the magnitudes of the luminous fluxes on the three-piece light-receiving elements change to different values depending on the offset of the focal point of the objective 2. Thus, a focus error signal FE is obtained by the following operation:

$$FE=17b+18b+19a+19c+20a+20c -(17a+17c+18a+18c+19b+20b)$$ [Equation 12]

In addition, as in the first embodiment, a signal TE1 for correcting a tracking error signal offset is obtained by the following equation:

$$TE1=16a+16d-(16b+16c)$$ [Equation 13]

A push pull signal TE2 is expressed as follows:

$$TE2=(17a+17b+17c+20a+20b+20c) -(18a+18b+18c+19a+19b+19c)$$ [Equation 14]

Thus, a tracking error signal TE in which an offset is corrected that is caused by the movement of the objective is expressed as follows:

$$TE=TE2-k*TE1$$ [Equation 15]

wherein (k) is a correction coefficient. In the above four equations, the detection signal names are represented by the light-receiving area names.

In this configuration, when the interval between the parting lines 13b and 13c of the composite diffraction element 13 is designated as V, Equation 11 is desirably met as in the first embodiment.

The feature of the above second embodiment is that the three-piece light-receiving elements are located at an equal distance from the light-emitting element in contrast to the first embodiment. This configuration advantageously reduces the width of the light-receiving element 14 in the horizontal direction. This embodiment is also advantageous in that even if the diffraction efficiency varies with the pitch of the diffraction grating due to the variation of an etching condition during a composite-diffraction element manufacturing process, the variation of the balance of a detection signal is small because of the equal diffraction grating pitch for each area according to this embodiment.

Third Embodiment

Figure 3:
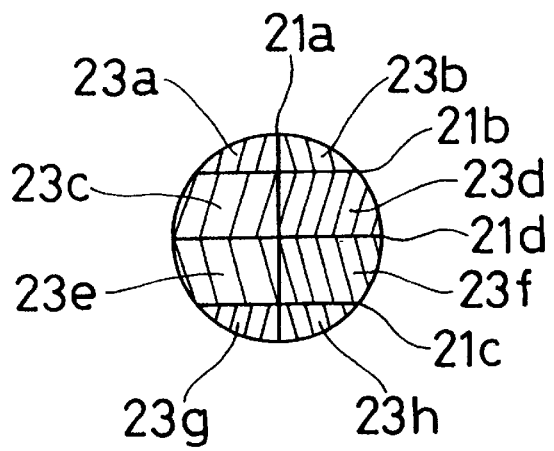
FIG. 3(a) is a top view describing a composite diffraction element according to a third embodiment of this invention.
FIG. 3(b) is a top view showing a layout of light-emitting and light-receiving elements according to this embodiment.
Figure 3:
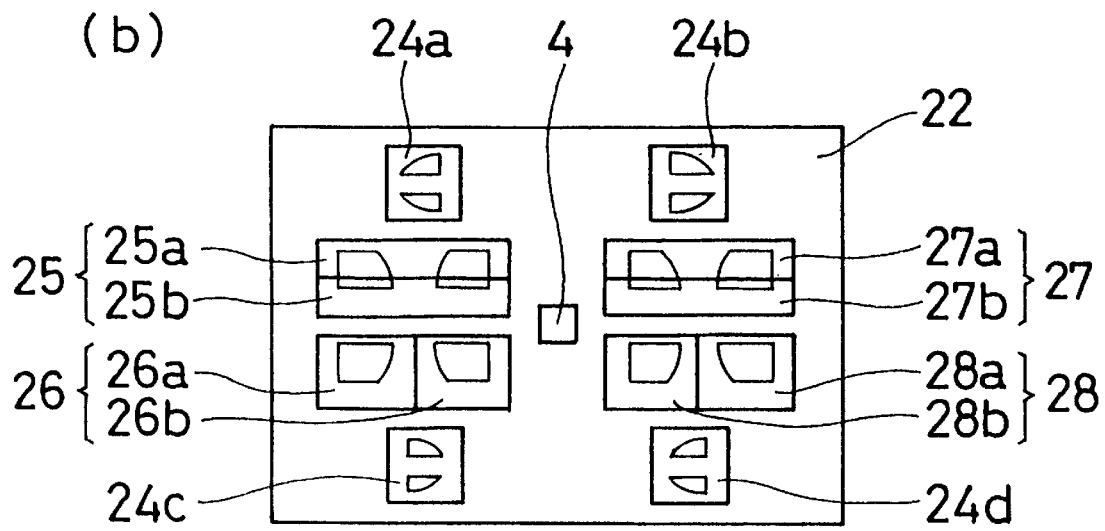

FIG. 3(a) is a conceptual drawing of a top surface of a composite diffraction element according to a third embodiment of this invention. FIG. 3(b) is a top view showing a layout of light-emitting and light-receiving elements. The configuration of this optical head is similar to that in the first embodiment, so it is not shown here and only a layout of a composite diffraction element and light-receiving elements that are different from those in the first embodiment is described.

In FIG. 3(a), 21a to 21d are area parting lines of the composite diffraction element; and 23a to 23h are divided areas wherein the stripes in the areas conceptually show the direction of the diffraction grating. In FIG. 3(b), 22 is a substrate on which light-emitting and light-receiving elements are arranged, 24a to 24d are unitary light-receiving elements; 25 to 28 are two-piece light-receiving elements; and 25a and 25b, 26a and 26b, 27a and 27b, and 28a and 28b are light-receiving areas each constituting the two-piece light-receiving element. The graphics shown inside each light-receiving element schematically show the shape of a luminous flux incident on the element.

A first parting line according to this invention corresponds to a parting line 21a, and a second to a fourth parting lines according to this invention similarly correspond to parting lines 21b to 21d.

The operation of the optical head of the above configuration is described below. Since it also has many characteristics in common with the first embodiment, only different features are explained. A luminous flux reflected by the optical disc and again entering the composite diffraction element is divided into a positive and a negative first order diffracted beams through the areas divided by the four parting lines 21a to 21d, and the diffracted beams travel toward the corresponding light-receiving elements. Diffracted beams through the areas 23a and 23g are incident on, for example, the light-receiving elements 24a and 24d, diffracted beams through the areas 23b and 23h are incident on, for example, the light-receiving elements 24b and 24c, a diffracted beam through the area 23c is incident on, for example, the two-piece light-receiving element 25 and light-receiving area 28b, a diffracted beam through the area 23d is incident on, for example, the two-piece light-receiving element 25 and light-receiving area 28a, a diffracted beam through the area 23e is incident on, for example, the two-piece light-receiving element 27 and light-receiving area 26b, and a diffracted beam through the area 23f is incident on, for example, the two-piece light-receiving element 27 and light-receiving area 26a. In this case, when the diffraction grating patterns in the areas 23c, 23d, 23e, and 23f have refracting power such as that of lens in such a way that, for example, the luminous flux incident on the two-piece light-receiving element 25 converges into a focus at a point further than this light-receiving element, while the luminous flux incident on the two-piece light-receiving element 27 converges into a focus at a point nearer to the composite diffraction element than this light-receiving element and that when the optical disc is placed at the focal point of the objective, the magnitudes of the luminous fluxes on the two-piece light-receiving elements 25 and 27 are substantially equal in the direction orthogonal to the parting lines of these light-receiving elements, then the magnitudes of the luminous fluxes on the two-piece light-receiving elements change to different values depending on the offset of the focal point of the objective. Thus, a focus error signal FE is obtained by the following operation:

$$FE=25a+27b-(25b+27a) \qquad \text{[Equation 16]}$$

In addition, as in the first embodiment, a signal TE1 for correcting a tracking error signal offset is obtained by the following equation:

$$TE1=24a+24d-(24b+24c) \qquad \text{[Equation 17]}$$

A push pull signal TE2 is expressed as follows:

$$TE2=26b+28b-(26a+28a) \qquad \text{[Equation 18]}$$

Thus, a tracking error signal TE in which an offset is corrected that is caused by the movement of the objective is expressed as follows:

$$TE=TE2-k*TE1 \qquad \text{[Equation 19]}$$

wherein (k) is a correction coefficient. In the above four equations, the detection signal names are represented by the light-receiving area names.

In this configuration, when the interval between the parting lines 21b and 21c of the composite diffraction element is designated as V, Equation 11 is desirably met as in each of the above embodiments.

In contrast to the first and second embodiments, the features of the above third embodiment are that despite the use of the two-piece light-receiving elements for detection, the number of light-receiving areas arranged is reduced and that since totally different detection signals from the light-receiving elements are used for the operations for the focus and tracking error signals, a signal addition operation can be performed using appropriate connections among the light receiving elements, thereby simplifying signal wiring for guiding detected light-receiving signals to the operation section.

Fourth Embodiment

Figure 4:
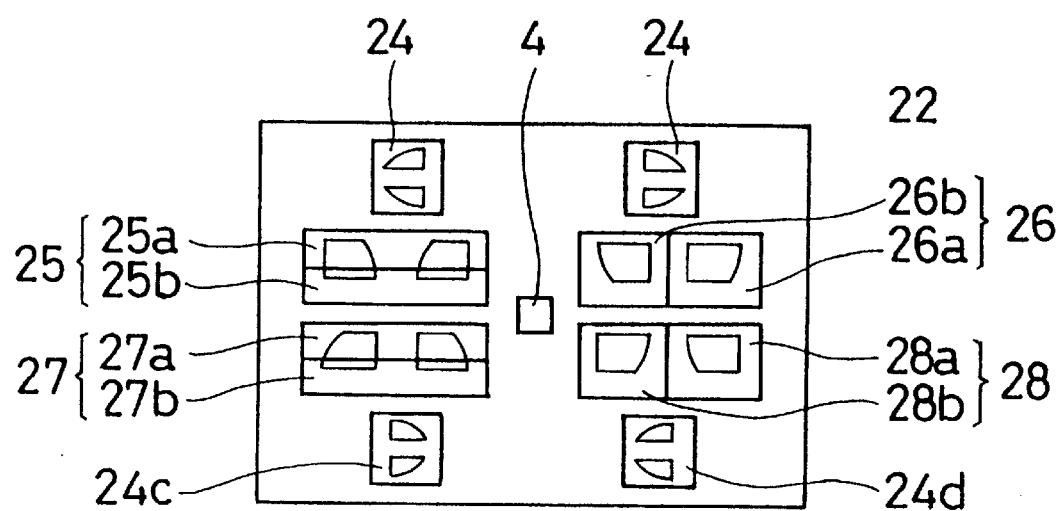
FIG. 4 is a top view describing a layout of light-receiving elements according to a fourth embodiment of this invention.

FIG. 4 is a top view showing a layout of light-emitting and light-receiving elements according to a fourth embodiment of this invention. The configuration of this optical head is similar to that in the first embodiment, so it is not shown here. In addition, this embodiment is the same as the above third embodiment except for the layout of the light-receiving elements, so the description of the composite diffraction element is omitted and each light-receiving element has a reference numeral corresponding to the third embodiment with its description omitted.

The operation of the optical head is described below. Since, however, it has many characteristics in common with the third embodiment, only different features are explained. In contrast to the third embodiment, the lens refracting power of the diffraction grating patterns in the areas 23c to 23f of the composite diffraction element is set so that, in the layout of the light-receiving elements in FIG. 4, the luminous flux incident on the two-piece light-receiving element 25 converges into a focus at a point further than this light-receiving element, while the luminous flux incident on the two-piece light-receiving element 27 converges into a focus at a point nearer to the composite diffraction element than this light-receiving element and so that when the optical disc is placed at the focal point of the objective, the magnitudes of the luminous fluxes on the two-piece light-receiving elements 25 and 27 are substantially equal in the direction orthogonal to the parting lines of these light-receiving elements. Thus, a focus error signal FE is obtained by the following operation, as described above:

$$FE=25a+27b-(25b+27a) \qquad \text{[Equation 20]}$$

In addition, a signal TE1 for correcting a tracking error signal offset is obtained by the following equation:

$$TE1=24a+24d-(24b+24c) \qquad \text{[Equation 21]}$$

A push pull signal TE2 is expressed as follows:

$$TE2=26b+28b-(26a+28a) \qquad \text{[Equation 22]}$$

Thus, a tracking error signal TE in which an offset is corrected that is caused by the movement of the objective is expressed as follows:

$$TE=TE2-k*TE1 \qquad \text{[Equation 23]}$$

wherein (k) is a correction coefficient. In the above four equations, the detection signal names are represented by the light-receiving area names.

The above fourth embodiment has characteristics similar to those of the third embodiment. Since each signal operation requires the addition of two signals from the light-receiving areas 25b and 27a, 26b and 28b, or 26a and 28a that sit adjacent to each other, each pair of areas can be changed to a single continuous light-receiving area to further simplify the layout of the light-receiving areas.

Fifth Embodiment

Figure 5:
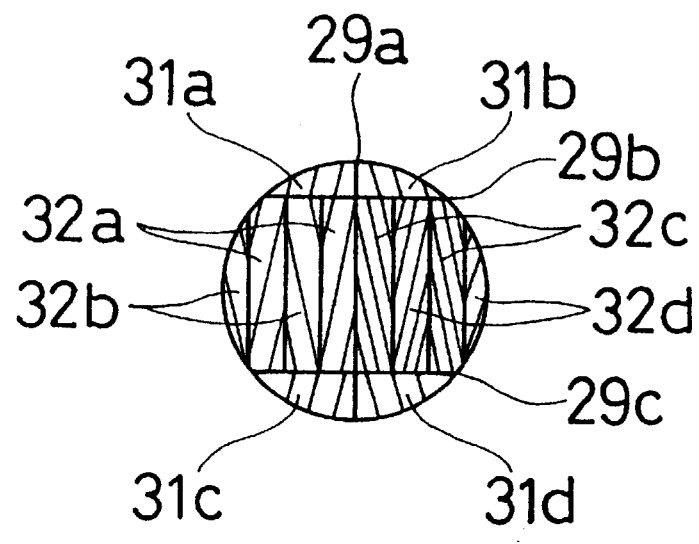
FIG. 5(a) is a top view describing a composite diffraction element according to a fifth embodiment of this invention.
FIG. 5(b) is a top view showing a layout of light-emitting and light-receiving elements according to this embodiment.
Figure 5:
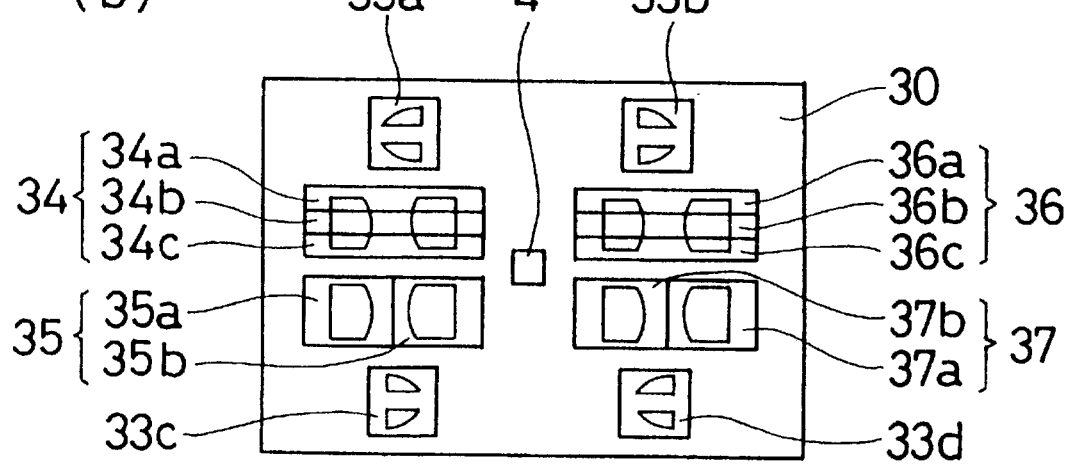

FIG. 5(a) is a conceptual drawing of a top surface of a composite diffraction element according to a fifth embodiment of this invention. FIG. 5(b) is a top view showing a layout of light-emitting and light-receiving elements. The configuration of this optical head is similar to that in the first embodiment, so it is not shown here and only a layout of a composite diffraction element and light-receiving elements that are different from those in the first embodiment is described.

In FIG. 5(a), 29a to 29c are area parting lines of the composite diffraction element; and 31a to 31d and 32a to 32d are divided areas wherein the stripes in the areas conceptually show the direction of the diffraction grating. Areas 32a to 32d are a plurality of band-like divisions parallel to the area parting line 29a which are obtained by dividing the portion between the area parting lines 29b and 29c and arranging each pair of the same divisions as an assembly in such a way that the areas 32a to 32d are alternated. In FIG. 5(b), 30 is a substrate on which light-emitting and light receiving elements are arranged; 33a to 33d are unitary light-receiving elements; 34 and 36 are three-piece light-receiving elements; 35 and 37 are two-piece light-receiving elements; and 34a to 34c, 36a to 36c, 35a and 35b, and 37a and 37b are light-receiving areas each constituting the three-piece or two-piece light-receiving element. The graphics shown inside each light-receiving element schematically show the shape of a luminous flux incident on the element.

A first assembly of band-like divisions according to this invention corresponds to, for example, the area 32a, and a second to a fourth assemblies of band-like divisions according to this invention similarly correspond to the areas 32b, 32c, and 32d.

The operation of the optical head of the above configuration is described below. Since it also has many characteristics in common with the first embodiment, only different features are explained. A luminous flux reflected by the optical disc and again entering the composite diffraction element is divided into a positive and a negative first order diffracted beams through the areas divided by the three parting lines 29a to 29c, and the diffracted beams travel toward the corresponding light-receiving elements. Diffracted beams through the areas 31a and 31c are incident on, for example, the light-receiving elements 33a and 33d, diffracted beams through the areas 31b and 31d are incident on, for example, the light-receiving elements 33b and 33c. In addition, diffracted beams through the assembly of band-like division 32a are incident on, for example, the three-piece light-receiving element 34 and light-receiving area 37b, diffracted beams through the assembly of band-like division 32b are incident on, for example, the three-piece light-receiving element 36 and light-receiving area 35b, diffracted beams through the assembly of band-like division 32c are incident on, for example, the three-piece light-receiving element 36 and light-receiving area 35a, and diffracted beams through the assembly of band-like division 32d are incident on, for example, the three-piece light-receiving element 34 and light-receiving area 37a. When the diffracted beams from the assembly of band-like divisions are distributed to the light-receiving elements in this manner, the luminous flux passing between the area parting lines 29b and 29c is spatially divided into halves shaped like band-like division, which are incident on the two three-piece light-receiving elements 34 and 36, respectively. This means that by dividing the luminous flux into a sufficiently large number of band-like divided beams, this luminous-flux division becomes equivalent to amplitude division. This case can be handled in the same manner as in the first and second embodiments.

In this case, when the diffraction grating patterns in the assemblies of band-like divisions 32a to 32d have refracting power such as that of a lens in such a way that, for example, the luminous flux incident on the three-piece light-receiving element 34 converges into a focus at a point further than this light-receiving element, while the luminous flux incident on the three-piece light-receiving element 36 converges into a focus at a point nearer to the composite diffraction element than this light-receiving element and that when the optical disc is placed at the focal point of the objective, the magnitudes of the luminous fluxes on the three-piece light-receiving elements 34 and 36 are substantially equal in the direction orthogonal to the parting lines of these light-receiving elements, then the magnitudes of the luminous fluxes on the three-piece light-receiving elements change to different values depending on the offset of the focal point of the objective. Thus, a focus error signal FE is obtained by the following operation:

$$FE=34b+36a+36c-(34a+34c+36b) \quad \text{[Equation 24]}$$

In addition, as described above, a signal TE1 for correcting a tracking error signal offset is obtained by the following equation:

$$TE1=33a+33d\Delta(33b+33c) \quad \text{[Equation 25]}$$

A push pull signal TE2 is expressed as follows:

$$TE2=35b+37b-(35a+37a) \quad \text{[Equation 26]}$$

Thus, a tracking error signal TE in which an offset is corrected that is caused by the movement of the objective is expressed as follows:

$$TE=TE2-k*TE1 \quad \text{[Equation 27]}$$

wherein (k) is a correction coefficient. In the above four equations, the detection signal names are represented by the light-receiving area names.

In this configuration, when the interval between the parting lines 29b and 29c of the composite diffraction element is designated as V, Equation 11 is desirably met as in each of the above embodiments.

In contrast to the first embodiment, the features of the above fifth embodiment are that despite the use of the three-piece light-receiving elements for detection, the number of light-receiving areas arranged is reduced and that since totally different detection signals from the light-receiving elements are used for the operations for the focus and tracking error signals, a signal addition operation can be performed using appropriate connections among the light-receiving elements, thereby simplifying signal connections for guiding detected light-receiving signals to the operation section.

Sixth Embodiment

Figure 6:
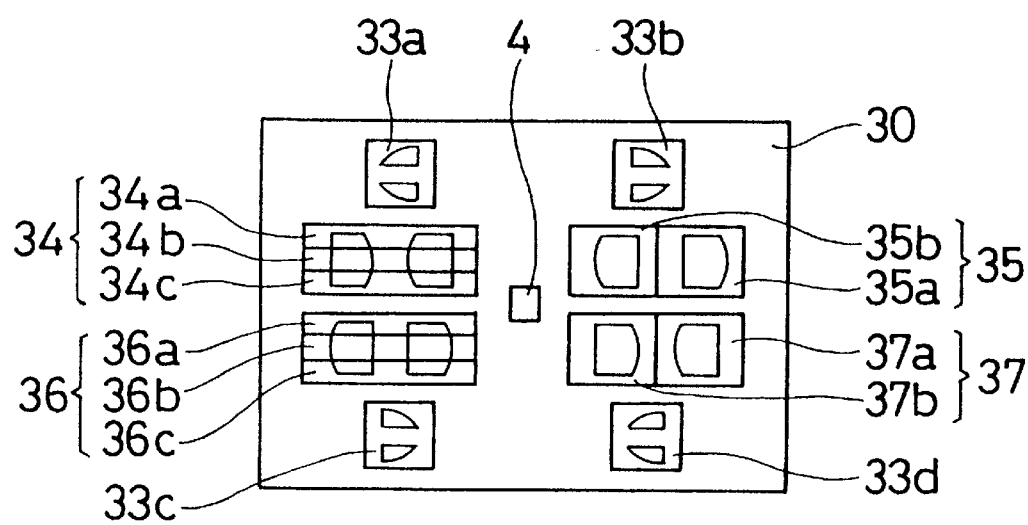
FIG. 6 shows a layout of light-receiving elements according to a sixth embodiment of this invention.

FIG. 6 is a top view showing a layout of light-emitting and light-receiving elements according to a sixth embodiment of this invention. The configuration of this optical head is similar to that in the first embodiment, so it is not shown here. In addition, this embodiment is the same as the above fifth embodiment except for the layout of the light-receiving elements, so the description of the composite diffraction element is omitted and each light-receiving element has a reference numeral corresponding to the fifth embodiment with its description omitted.

The operation of the optical head is described below. Since, however, it has many characteristics in common with the fifth embodiment, only different features are explained. The lens refracting power of the diffraction grating patterns inside the assemblies of band-like divisions 32a to 32d is set so that, in the layout of the light-receiving elements in FIG. 6 unlike the fifth embodiment, the luminous flux incident on the three-piece light-receiving element 34 converges into a focus at a point further than this light-receiving element, while the luminous flux incident on the three-piece light-receiving element 36 converges into a focus at a point nearer to the composite diffraction element than this light-receiving element and so that when the optical disc is placed at the focal point of the objective, the magnitudes of the luminous fluxes on the three-piece light-receiving elements 34 and 36 are substantially equal in the direction orthogonal to the parting lines of these light-receiving elements. Thus, a focus error signal FE is obtained by the following operation, as described above:

$$FE=34b+36a+36c-(34a+34c+36b) \quad \text{[Equation 28]}$$

In addition, a signal TE1 for correcting a tracking error signal offset is obtained by the following equation, as described above:

$$TE1=33a+33d31 \ (33b+33c) \quad \text{[Equation 29]}$$

A push pull signal TE2 is expressed as the follows:

$$TE2=35b+37b-(35a+37a) \quad \text{[Equation 30]}$$

Thus, a tracking error signal TE is expressed as follows:

$$TE=TE2-k*TE1 \qquad [\text{Equation 31}]$$

wherein (k) is a correction coefficient. In the above four equations, the detection signal names are represented by the light-receiving area names.

The above sixth embodiment has characteristics similar to those of the fifth embodiment. Since each signal operation requires the addition of two signals from the light-receiving areas 35b and 37b or 35a and 37a that sit adjacent to each other, each pair of areas can be changed to a single continuous light-receiving area to further simplify the layout of the light-receiving areas.

Seventh Embodiment

Figure 7:
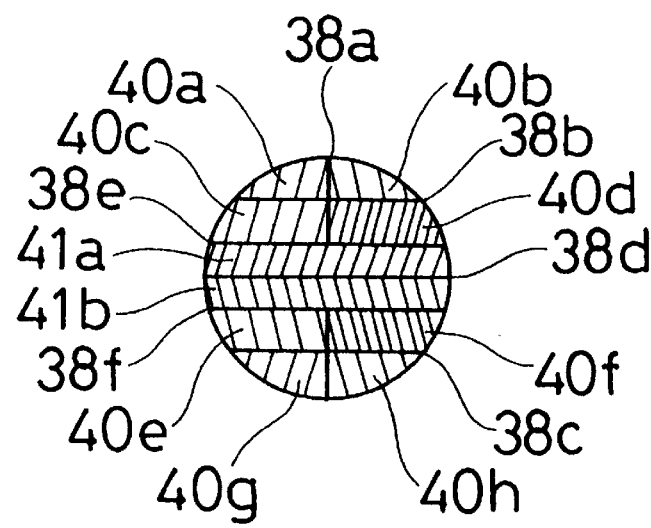
FIG. 7(a) is a top view describing a composite diffraction element according to a seventh embodiment of this invention.
FIG. 7(b) is a top view showing a layout of light-emitting and light-receiving elements according to this embodiment.
Figure 7:
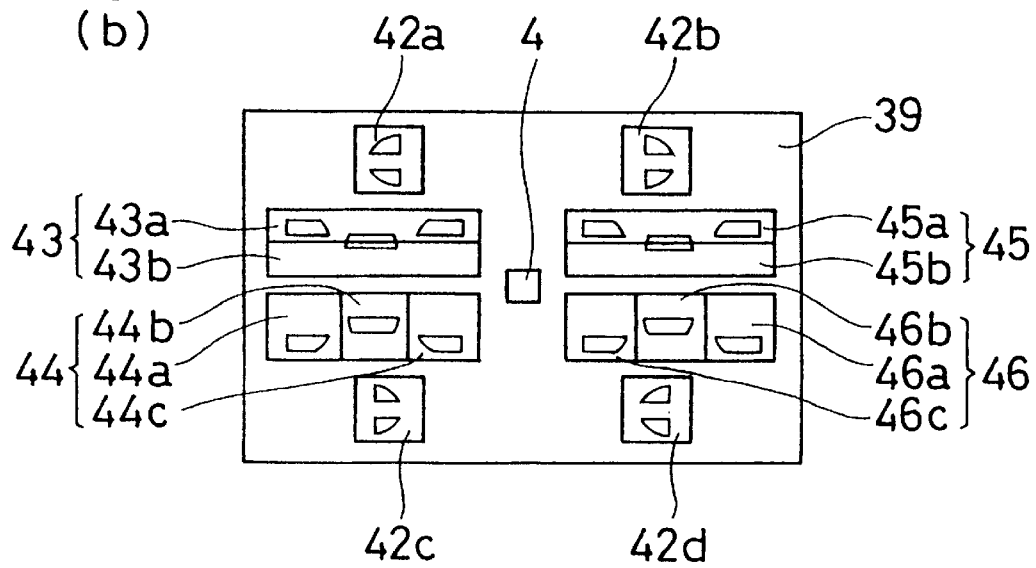

FIG. 7(a) is a conceptual drawing of a top surface of a composite diffraction element according to a seventh embodiment of this invention. FIG. 7(b) is a top view showing a layout of light-emitting and light-receiving elements. The configuration of this optical head is similar to that in the first embodiment, so it is not shown here and only a layout of a composite diffraction element and light-receiving elements that are different from those in the first embodiment is described.

In FIG. 7(a), 38a to 38f are area parting lines of the composite diffraction element; and 40a to 40h and 41a and 41b are divided areas wherein the stripes in the areas conceptually show the direction of the diffraction grating. In FIG. 7(b), 39 is a substrate on which light-emitting and light-receiving elements are arranged, 42a to 42d are unitary light-receiving elements; 43 and 45 are two-piece light-receiving elements; 44 and 46 are three-piece light-receiving elements; and 43a and 43b, 44a to 44c, 45a and 45b, and 46a to 46c are light-receiving areas each constituting the two-piece or three-piece light-receiving element. The graphics shown inside each light-receiving element schematically show the shape of a luminous flux incident on the element.

The operation of the optical head of the above configuration is described below. Since it also has many characteristics in common with the first embodiment, only different features are explained. A luminous flux reflected by the optical disc and again entering the composite diffraction element is divided into a positive and a negative first order diffracted beams through the areas divided by the six parting lines 38a to 38f, and the diffracted beams travel toward the corresponding light-receiving elements. Diffracted beams through the areas 40a and 40g are incident on, for example, the light-receiving elements 42a and 42d, diffracted beams through the areas 40b and 40h are incident on, for example, the light-receiving elements 42b and 42c, a diffracted beam through the area 40c is incident on, for example, the two-piece light-receiving element 43 and light-receiving area 46c, a diffracted beam through the area 40d is incident on, for example, the two-piece light-receiving element 43 and light-receiving area 46a, a diffracted beam through the area 40e is incident on, for example, the two-piece light-receiving element 45 and light-receiving area 44c, a diffracted beam through the area 40f is incident on, for example, the two-piece light-receiving element 45 and light-receiving area 44a, a diffracted beam through the area 41a is incident on, for example, the two-piece light-receiving element 43 and light-receiving area 46b, and a diffracted beam through the area 41b is incident on, for example, the two-piece light-receiving element 45 and light-receiving area 44b. In this case, when the diffraction grating patterns in the areas 40c, 40d, 40e, 40f, 41a, and 41b have refracting power such as that of lens in such a way that, for example, the luminous flux incident on the two-piece light-receiving element 43 converges into a focus at a point further than this light-receiving element, while the luminous flux incident on the two-piece light-receiving element 45 converges into a focus at a point nearer to the composite diffraction element than this light-receiving element and that when the optical disc is placed at the focal point of the objective, the magnitudes of the luminous fluxes on the two-piece light-receiving elements 43 and 45 are substantially equal in the direction orthogonal to the parting lines of these light-receiving elements, then the magnitudes of the luminous fluxes on the two-piece light-receiving elements change to different values depending on the offset of the focal point of the objective. Thus, a focus error signal FE is obtained by the following operation:

$$FE=43a+45b-(43b+45a) \qquad [\text{Equation 32}]$$

In addition, a signal TE1 for correcting a tracking error signal offset is obtained by the following equation, as described above:

$$TE1=42a+42d-(42b+42c) \qquad [\text{Equation 33}]$$

A push pull signal TE2 is expressed as follows:

$$TE2=44c+46c-(44a+46a) \qquad [\text{Equation 34}]$$

Thus, a tracking error signal TE in which an offset is corrected that is caused by the movement of the objective is expressed as follows:

$$TE=TE2-k*TE1 \qquad [\text{Equation 35}]$$

wherein (k) is a correction coefficient. In the above four equations, the detection signal names are represented by the light-receiving area names.

In the above equations, detection signals from the light-receiving areas 44b and 46b are not used for the tracking error signal operation. That is, the signal detection method according to this present embodiment uses the luminous flux between the area parting lines 38e and 38f of the composite diffraction element for the focus error signal detection but not for the tracking error signal detection. This corresponds to the technique for reducing an offset in the tracking error signal caused by the inclination of the optical disc in the radial direction as described in the second conventional technique.

In this configuration, when the interval between the parting lines 38b and 38c of the composite diffraction element is designated as V, Equation 11 is desirably met as in each of the above embodiments. Furthermore, however, when the interval between the parting lines 38e and 38f is indicated as W, the numerical aperture of the objective on the optical-disc side is denoted as NA, the wavelength is indicated as $\lambda$, the pitch of the information tracks is referred to as (d), and the diameter of a luminous flux on the composite diffraction element is denoted as D, the following equation is desirably met:

$$0.12\sqrt{1-\frac{1}{4}\left(\frac{\lambda}{NA\times d}\right)^2} < \frac{W}{D} < 0.5\sqrt{1-\frac{1}{4}\left(\frac{\lambda}{NA\times d}\right)^2} \qquad [\text{Equation 36}]$$

If, however, the interval W is increased without meeting Equation 36, the areas 40c, 40d, 40e, and 40f used to detect a push pull signal component are reduced to decrease the amplitude of the detected push pull signal, thereby preventing a sufficient tracking error signal from being obtained. On the other hand, if the interval w is reduced without meeting Equation 36, this reduces the effect of reducing an offset caused by the inclination of the optical disc in the radial direction.

In addition to the features of the third and fourth embodiments of similar configurations, the above seventh embodiment has a feature that it reduces an offset in the tracking error signal caused by the inclination of the optical disc in the radial direction, thereby providing an optical head that operates more stably.

Although this embodiment arranges the light-receiving elements as described above, similar signal detection can be achieved by changing only the positions of the light-receiving elements and the diffraction grating pattern inside each area of the composite diffraction element, as shown in the third and fourth embodiments.

Eighth Embodiment

Figure 8:
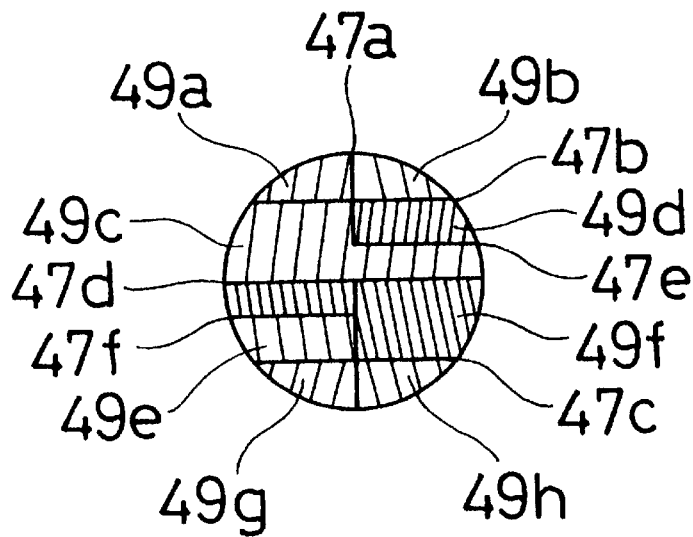
FIG. 8(a) is a top view describing a composite diffraction element according to an eighth embodiment of this invention.
FIG. 8(b) is a top view showing a layout of light-emitting and light-receiving elements according to this embodiment.
Figure 8:
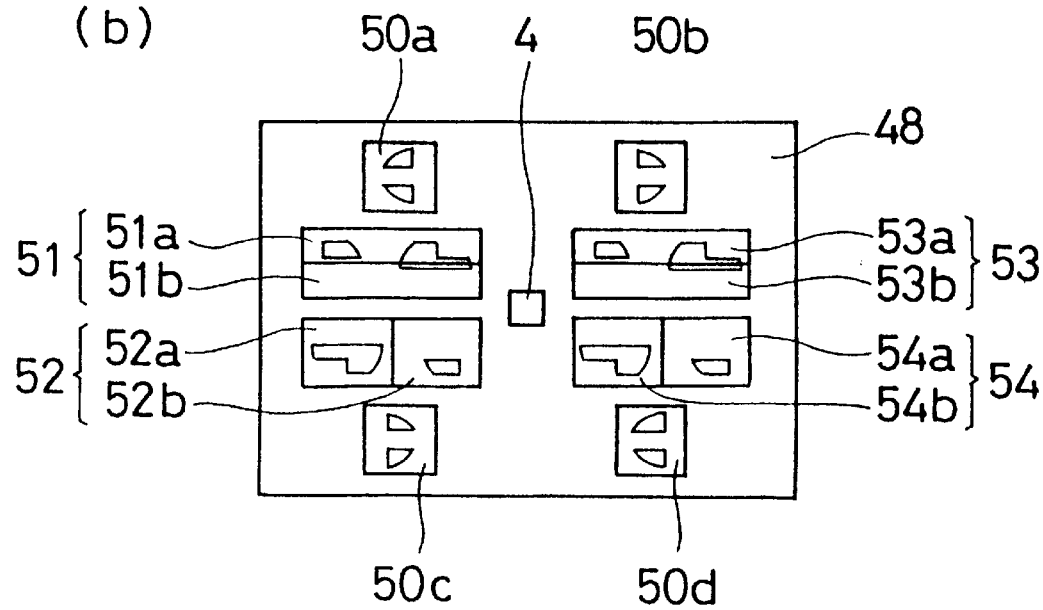

FIG. 8(a) is a conceptual drawing of a top surface of a composite diffraction element according to an eighth embodiment of this invention. FIG. 8(b) is a top view showing a layout of light-emitting and light-receiving elements. The configuration of this optical head is similar to that in the first embodiment, so it is not shown here and only a layout of a composite diffraction element and light-receiving elements that are different from those in the first embodiment is described.

In FIG. 8(a), 47a to 47f are area parting lines of the composite diffraction element. The parting line 47e corresponds to only the right side of the element relative to the parting line 47a, while the parting line 47f corresponds to only the left side of the element relative to the parting line 47a. Reference numerals 49a to 49h designate divided areas wherein the stripes in the areas conceptually show the direction of the diffraction grating. In FIG. 8(b), 48 is a substrate on which light-emitting and light-receiving elements are arranged, 50a to 50d are unitary light-receiving elements; 51 to 54 are two-piece light-receiving elements; and 51a and 51b, 52a and 52b, 53a and 53b, and 54a and 54b are light-receiving areas each constituting the two-piece light-receiving element. The graphics shown inside each light-receiving element schematically show the shape of a luminous flux incident on the element.

The operation of the optical head of the above configuration is described below. Since it also has many characteristics in common with the first embodiment, only different features are explained. A luminous flux reflected by the optical disc and again entering the composite diffraction element is divided into a positive and a negative first order diffracted beams through the areas divided by the six parting lines 47a to 47f, and the diffracted beams travel toward the corresponding light-receiving elements. Diffracted beams through the areas 49a and 49g of the composite diffraction element are incident on, for example, the light-receiving elements 50a and 50d, diffracted beams through the areas 49b and 49h are incident on, for example, the light-receiving elements 50b and 50c, a diffracted beam through the area 49c is incident on, for example, the two-piece light-receiving element 51 and light-receiving area 54b, a diffracted beam through the area 49d is incident on, for example, the two-piece light-receiving element 51 and light-receiving area 54a, a diffracted beam through the area 49e is incident on, for example, the two-piece light-receiving element 53 and light-receiving area 52b, and a diffracted beam through the area 49f is incident on, for example, the two-piece light-receiving element 53 and light-receiving area 52a. In this case, when the diffraction grating patterns in the areas 49c, 49d, 49e, and 49f have refracting power such as that of lens in such a way that, for example, the luminous flux incident on the two-piece light-receiving element 51 converges into a focus at a point further than this light-receiving element, while the luminous flux incident on the two-piece light-receiving element 53 converges into a focus at a point nearer to the composite diffraction element than this light-receiving element and that when the optical disc is placed at the focal point of the objective, the magnitudes of the luminous fluxes on the two-piece light-receiving elements 51 and 53 are substantially equal in the direction orthogonal to the parting lines of these light-receiving elements, then the magnitudes of the luminous fluxes on the two-piece light-receiving elements change to different values depending on the offset of the focal point of the objective. Thus, a focus error signal FE is obtained by the following operation:

$$FE=51a+53b-(51b+53a) \qquad \text{[Equation 37]}$$

In addition, a signal TE1 for correcting a tracking error signal offset is obtained by the following equation, as described above:

$$TE1=50a+50d-(50b+50c) \qquad \text{[Equation 38]}$$

A push pull signal TE2 is expressed as follows:

$$TE2=54b+52b-(52a+54a) \qquad \text{[Equation 39]}$$

Thus, a tracking error signal TE in which an offset is corrected that is caused by the movement of the objective is expressed as follows:

$$TE=TE2-k*TE1 \qquad \text{[Equation 40]}$$

wherein (k) is a correction coefficient. In the above four equations, the detection signal names are represented by the light-receiving area names.

The signal detection method according to this embodiment divides into two areas on the area parting line 47d a luminous flux passing through the area between the area parting lines 47e and 47f of the composite diffraction element so that the two areas are each evenly contained in a signal 52a or 54b used to detect the push pull signal. The differential operation in Equation 39 is then performed to provide an offset in order to remove from the tracking signal the signals from these areas. Despite the two spatially different areas, an appropriate offset can be provided due to the substantial symmetry of the distribution of the amount of light reflected from the optical disc, relative to the area parting line 47d of the composite diffraction element. This signal detection uses the method different from the one according to the seventh embodiment to achieve the same object as the seventh embodiment to reduce an offset in the tracking error signal caused by the inclination of the optical disc in the radial direction.

In this configuration, when the interval between the parting lines 47b and 47c of the composite diffraction element is designated as V, Equation 11 is desirably met as in each of the above embodiments. Furthermore, when the interval between the parting lines 47e and 47f is indicated as W, Equation 36 is desirably met as in the seventh embodiment.

In addition to the features of the seventh embodiment of a similar configuration, the above eighth embodiment has a feature that the number of luminous fluxes to be detected and thus the number and area of the light-receiving areas are reduced to mitigate the effect of light scattering inside the optical head, that is, stray light. This feature serves to provide an optical head that generates better detection signals.

Although this embodiment arranges the light-receiving elements as described above, similar signal detection can be achieved by changing only the positions of the light-receiving elements and the diffraction grating pattern inside each area of the composite diffraction element, as shown in the third and fourth embodiments.

Ninth Embodiment

FIG. 9(a) is a conceptual drawing of a top surface of a composite diffraction element according to a ninth embodiment of this invention. FIG. 9(b) is a top view showing a layout of light-emitting and light-receiving elements. The configuration of this optical head is similar to that in the first embodiment, so it is not shown here and only a layout of a composite diffraction element and light-receiving elements that are different from those in the first embodiment is described.

In FIG. 9(a), 55a to 55e are area parting lines of the composite diffraction element; and 57a to 57d, 58a to 58h, and 59a to 59d are divided areas wherein the stripes in the areas conceptually show the direction of the diffraction grating. Areas 58a to 58h and 59a to 59d are a plurality of band-like divisions parallel to the parting line 55a which are obtained by dividing the portion between the parting lines 55b and 55c and arranging each pair of the same divisions as an assembly in such a way that the areas 58a to 58h and 59a to 59d are alternated in the six areas divided by the parting lines 55a, 55d, and 55e. Twelve pairs of band-like divisions as assemblies are provided in these areas; that is, four pairs of band-like divisions are provided between the parting lines 55b and 55d, four pairs of band-like divisions are provided between the parting lines 55d and 55e, and four pairs of band-like divisions are provided between the parting lines 55e and 55c.

In FIG. 9(b), 56 is a substrate on which light-emitting and light-receiving elements are arranged; 60a to 60d are unitary light-receiving elements; 61 and 62 are three-piece light-receiving elements; 63 and 64 are two-piece light-receiving elements; and 61a to 61c, 62a to 62c, 63a and 63b, and 64a and 64b are light-receiving areas each constituting the three-piece or two-piece light-receiving element. The graphics shown inside each light-receiving element schematically show the shape of a luminous flux incident on the element.

A fifth assembly of band-like divisions according to this invention corresponds to, for example, the areas 59a and 59c, and a sixth assembly of band-like divisions corresponds to the areas 59b and 59d.

The operation of the optical head of the above configuration is described below. Since it also has many characteristics in common with the first embodiment, only different features are explained. A luminous flux reflected by the optical disc and again entering the composite diffraction element is divided into a positive and a negative first order diffracted beams through the areas divided by the five parting lines 55a to 55e, and the diffracted beams travel toward the corresponding light-receiving elements. Diffracted beams through the areas 57a and 57c are incident on, for example, the light-receiving elements 60a and 60d, and diffracted beams through the areas 57b and 57d are incident on, for example, the light-receiving elements 60b and 60c.

In addition, diffracted beams through the assembly of band-like divisions 58a are incident on, for example, the three-piece light-receiving element 62 and light-receiving area 63b, diffracted beams through the assembly of band-like divisions 58b are incident on, for example, the three-piece light-receiving element 61 and light-receiving area 64a, diffracted beams through the assembly of band-like divisions 58c are incident on, for example, the three-piece light-receiving element 61 and light-receiving area 64b, diffracted beams through the assembly of band-like divisions 58d are incident on, for example, the three-piece light-receiving element 62 and light-receiving area 63a, diffracted beams through the assembly of band-like divisions 58e are incident on, for example, the three-piece light-receiving element 62 and light-receiving area 63b, diffracted beams through the assembly of band-like divisions 58f are incident on, for example, the three-piece light-receiving element 61 and light-receiving area 64a, diffracted beams through the assembly of band-like divisions 58g are incident on, for example, the three-piece light-receiving element 61 and light-receiving area 64b, and diffracted beams through the assembly of band-like division 58h are incident on, for example, the three-piece light-receiving element 62 and light-receiving area 63a.

In addition, diffracted beams through the assemblies of band-like divisions 59a and 59c are incident on the three-piece light-receiving element 61 and a place adjacent to the two-piece light-receiving element 64 and without a light-receiving area, and diffracted beams through the assemblies of band-like divisions 59b and 59d are incident on the three-piece light-receiving element 62 and a place adjacent to the two-piece light-receiving element 63 and without a light-receiving area. When the luminous fluxes are divided in this manner, the luminous flux between the area parting lines 55b and 55c is spatially evenly split into halves shaped like band-like division, which are then distributed to the two three-piece light-receiving elements. This means that by dividing the luminous flux into a sufficiently large number of band-like divided beams, this luminous-flux division becomes equivalent to amplitude division. This case can be handled in the same manner as in the first and second embodiments.

In this case, when the diffraction grating patterns in the assemblies of band-like divisions 58a to 58g and 59a to 59d have refracting power such as that of a lens in such a way that, for example, the luminous flux incident on the three-piece light-receiving element 61 converges into a focus at a point further than this light-receiving element, while the luminous flux incident on the three-piece light-receiving element 62 converges into a focus at a point nearer to the composite diffraction element than this light-receiving element and that when the optical disc is placed at the focal point of the objective, the magnitudes of the luminous fluxes on the three-piece light-receiving elements 61 and 62 are substantially equal in the direction orthogonal to the parting lines of these light-receiving elements, then the magnitudes of the luminous fluxes on the three-piece light-receiving elements change to different values depending on the offset of the focal point of the objective. Thus, a focus error signal FE is obtained by the following operation:

$$FE = 61b + 62a + 62c - (61a + 61c + 62b) \qquad \text{[Equation 41]}$$

In addition, as described above, a signal TE1 for correcting a tracking error signal offset is obtained by the following equation:

$$TE1 = 60a + 60d - (60b + 60c) \qquad \text{[Equation 42]}$$

A push pull signal TE2 is obtained by detecting the differential between detection signals for luminous fluxes passing through the assemblies of band-like divisions 58a, 58b, 58e, and 58f located to the left of the area parting line 55a of the composite diffraction element and detection signals for luminous fluxes passing through the assemblies of band-like divisions 58c, 58d, 58g, and 58h located to the right of the area parting line 55a. Thus, the following equation is established:

$$TE2 = 63b + 64a - (63a + 64b) \qquad \text{[Equation 43]}$$

In addition, a tracking error signal TE in which an offset is corrected that is caused by the movement of the objective is expressed as follows:

$$TE = TE2 - k*TE1 \qquad \text{[Equation 44]}$$

wherein (k) is a correction coefficient. In the above four equations, the detection signal names are represented by the light-receiving area names.

The signal detection method according to this embodiment sets the diffraction angle and the layout of the light-receiving elements so as not to allow the luminous flux passing between the parting lines 55d and 55e to enter the light-receiving elements that detect a push pull signal. This signal detection uses the method different from the one according to the seventh embodiment to achieve the same object as the seventh embodiment to reduce an offset in the tracking error signal caused by the inclination of the optical disc in the radial direction.

In this configuration, when the interval between the parting lines 55b and 55c of the composite diffraction element is designated as V, Equation 11 is desirably met. Furthermore, when the interval between the parting lines 55d and 55e is indicated as W, Equation 36 is desirably met as in the seventh embodiment.

The above ninth embodiment reduces an offset in the tracking error signal caused by the inclination of the optical disc in the radial direction, as in the seventh embodiment. In addition, since the two types of assemblies of band-like divisions having a small and a large diffraction grating pitches, respectively, are formed in the right and left areas relative to the area parting line 55a, the diffraction efficiencies of the areas from which a push pull signal is to be detected are substantially balanced to reduce the variation of the balance of the tracking signal even if the diffraction efficiency varies with the diffraction grating pitch due to the variation of an etching condition during a composite-diffraction element manufacturing process. The areas 58b, 58d, 58f and 58h are said assembly of band-like divisions having a small diffraction grating pitches. The areas 58a, 58c, 58e, 58g, 59a, 59b, 59c and 59d are said assembly of band-like divisions having a large diffraction grating pitches Although the plurality of band-like divisions constituting each assembly of band-like divisions are rectangles parallel to the first parting line 55a, similar functions can be provided even if the band-like division is a triangle, a parallelogram, a trapezoid, or their combination.

Tenth Embodiment

Figure 10:
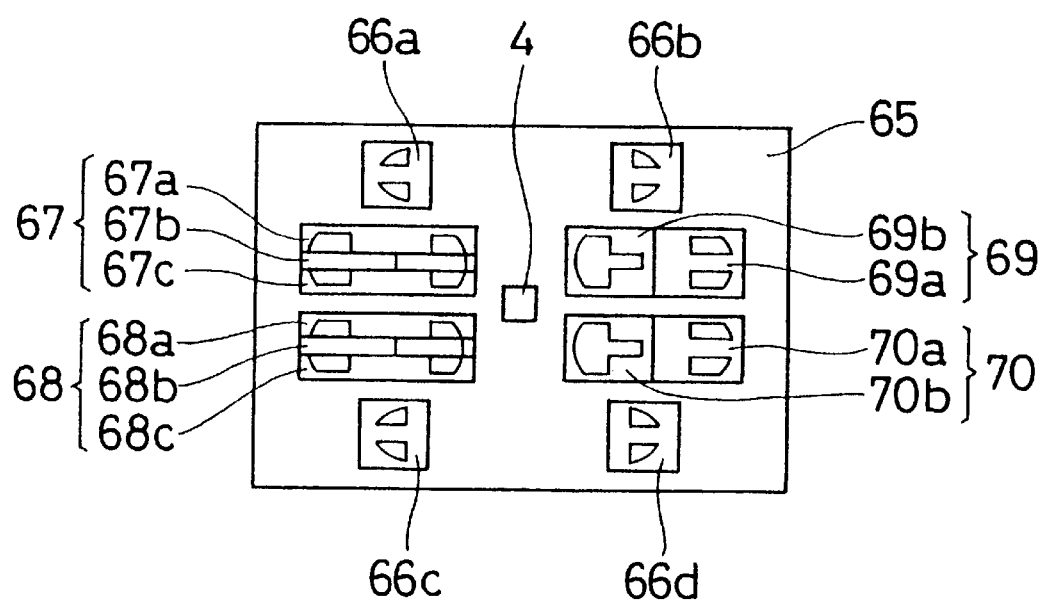
FIG. 10 shows a layout of light-receiving elements according to a tenth embodiment of this invention.

FIG. 10 is a top view showing a layout of light-emitting and light-receiving elements according to a tenth embodiment. The configuration of this optical head is similar to that in the first embodiment, so it is not shown here. In addition, the divided areas of the composite diffraction element are equal to those in the above ninth embodiment, so its conceptual top view is omitted. Thus, only the components different from those of the ninth embodiment are described in terms of their configuration.

In the composite diffraction element in FIG. 9(a), the diffraction angle of the diffraction grating formed inside the four assemblies of band-like divisions between the parting lines 55d and 55e is different from that in the ninth embodiment. This diffraction angle is discussed in the description of the operation of this invention.

In FIG. 10, 65 is a substrate on which light-emitting and light-receiving elements are arranged; 66a to 66d are unitary light-receiving elements; 67 and 68 are three-piece light-receiving elements; 69 and 70 are two-piece light-receiving elements; and 67a to 67c, 68a to 68c, 69a and 69b, and 70a and 70b are light-receiving areas each constituting the three-piece or two-piece light-receiving element. The graphics shown inside each light-receiving element schematically show the shape of a luminous flux incident on the element.

A fifth assembly of band-like divisions according to this invention corresponds to, for example, the area 59b, and a sixth to an eighth assemblies of band-like divisions correspond to the areas 59a, 59c, and 59d.

Next, the operation of the optical head of the above configuration is described below. Since it also has many characteristics in common with the first embodiment, only different features are explained. The division of a luminous flux through the composite diffraction element is described with reference to FIG. 9(a). A luminous flux reflected by the optical disc and again entering the composite diffraction element is divided into a positive and a negative first order diffracted beams through the areas divided by the five parting lines 55a to 55e, and the diffracted beams travel toward the corresponding light-receiving elements. Diffracted beams through the areas 57a and 57c are incident on, for example, the light-receiving elements 66a and 66d, and diffracted beams through the areas 57b and 57d are incident on, for example, the light-receiving elements 66b and 66c. In addition, diffracted beams through the assembly of band-like divisions 58a are incident on, for example, the three-piece light-receiving element 68 and light-receiving area 69b, diffracted beams through the assembly of band-like divisions 58b are incident on, for example, the three-piece light-receiving element 67 and light-receiving area 70a, diffracted beams through the assembly of band-like divisions 58c are incident on, for example, the three-piece light-receiving element 67 and light-receiving area 70b, diffracted beams through the assembly of band-like divisions 58d are incident on, for example, the three-piece light-receiving element 68 and light-receiving area 69a, diffracted beams through the assembly of band-like divisions 58e are incident on, for example, the three-piece light-receiving element 68 and light-receiving area 69b, diffracted beams through the assembly of band-like divisions 58f are incident on, for example, the three-piece light-receiving element 67 and light-receiving area 70a, diffracted beams through the assembly of band-like divisions 58g are incident on, for example, the three-piece light-receiving element 67 and light-receiving area 70b, and diffracted beams through the assembly of band-like divisions 58h are incident on, for example, the three-piece light-receiving element 68 and light-receiving area 69a. In addition, diffracted beams through the assemblies of band-like divisions 59a and 59c are incident on the three-piece light-receiving element 67 and light-receiving area 70b, and diffracted beams through the assemblies of band-like divisions 59*b* and 59*d* are incident on the three-piece light-receiving element 68 and light-receiving area 69*b*.

When the luminous fluxes are divided in this manner, the luminous flux between the area parting lines 55*b* and 55*c* is spatially evenly split into halves shaped like band-like division, which are then evenly distributed to the two three-piece light-receiving elements 67 and 68. This means that by dividing the luminous flux into a sufficiently large number of band-like divided beams, this luminous-flux division becomes equivalent to amplitude division. This case can be handled in the same manner as in the first and second embodiments.

In this case, when the diffraction grating patterns in the assemblies of the band-like divisions 58*a* to 58*h* and 59*a* to 59*d* have refracting power such as that of a lens in such a way that, for example, the luminous flux incident on the three-piece light-receiving element 67 converges into a focus at a point further than this light-receiving element, while the luminous flux incident on the three-piece light-receiving element 68 converges into a focus at a point nearer to the composite diffraction element than this light-receiving element and that when the optical disc is placed at the focal point of the objective, the magnitudes of the luminous fluxes on the three-piece light-receiving elements 67 and 68 are substantially equal in the direction orthogonal to the parting lines of these light-receiving elements, then the magnitudes of the luminous fluxes on the three-piece light-receiving elements change to different values depending on the offset of the focal point of the objective. Thus, a focus error signal FE is obtained by the following operation:

$$FE=67b+68a+68c-(67a+67c+68b) \qquad \text{[Equation 45]}$$

In addition, as described above, a signal TE1 for correcting a tracking error signal offset is obtained by the following equation:

$$TE1=66a+66d-(66b+66c) \qquad \text{[Equation 46]}$$

A push pull signal TE2 is obtained by detecting the differential between detection signals for luminous fluxes passing through the assemblies of band-like divisions 58*a*, 58*b*, 58*e*, and 58*f* located to the left of the area parting line 55*a* of the composite diffraction element and detection signals for luminous fluxes passing through the assemblies of band-like divisions 58*c*, 58*d*, 58*g*, and 58*h* located to the right of the area parting line 55*a*. Thus, this signal TE2 is determined by the following operation:

$$TE2=69b+70a-(69a+70b) \qquad \text{[Equation 47]}$$

In this case, in the area other than the areas used to detect a push pull signal, that is, in the four assemblies of band-like divisions 59*a* to 59*d* between the area parting lines 55*d* and 55*e* of the composite diffraction element, the light-receiving area 69*b* receives luminous fluxes from the assemblies of band-like divisions 59*b* and 59*d*, and the light-receiving area 70*b* receives luminous fluxes from the assemblies of band-like divisions 59*a* and 59*c*. If, however, there are a sufficiently large number of band-like divisions, this band-like division becomes equivalent to amplitude division. Consequently, the luminous flux passing between the area parting lines 55*d* and 55*e* is spatially evenly divided into two beams, which are then incident on the light-receiving areas 69*b* and 70*b*. As a result, the effect of these beams is offset by the differential detection in Equation 47.

A tracking error signal TE in which an offset is corrected that is caused by the movement of the objective is expressed as follows:

$$TE=TE2-k*TE1 \qquad \text{[Equation 48]}$$

wherein (k) is a correction coefficient. In the above four equations, the detection signal names are represented by the light-receiving area names.

The signal detection method according to this embodiment sets the diffraction angle of the composite diffraction element and the layout of the light-receiving elements so as to allow the luminous flux passing between the parting lines 55*d* and 55*e* to evenly enter the light-receiving elements that detect a push pull signal. This signal detection uses the method different from the one according to the seventh embodiment to achieve the same object as the seventh embodiment to reduce an offset in the tracking error signal caused by the inclination of the optical disc in the radial direction.

In this configuration, as in the seventh embodiment, when the interval between the parting lines 55*b* and 55*c* of the composite diffraction element is designated as V, Equation 11 is desirably met, and when the interval between the parting lines 55*d* and 55*e* is indicated as W, Equation 36 is desirably met.

The above optical head according to this embodiment can reduce an offset in the tracking error signal caused by the inclination of the optical disc in the radial direction, as in the seventh embodiment. In addition, since the two types of assemblies of band-like divisions having a small and a large diffraction grating pitches, respectively, are formed in the right and left areas relative to the area parting line 55*a*, the diffraction efficiencies of the areas from which a push pull signal is to be detected are substantially balanced to reduce the variation of the balance of the tracking signal even if the diffraction efficiency varies with the diffraction grating pitch due to the variation of an etching condition during a composite-diffraction element manufacturing process.

Eleventh Embodiment

Figure 11:
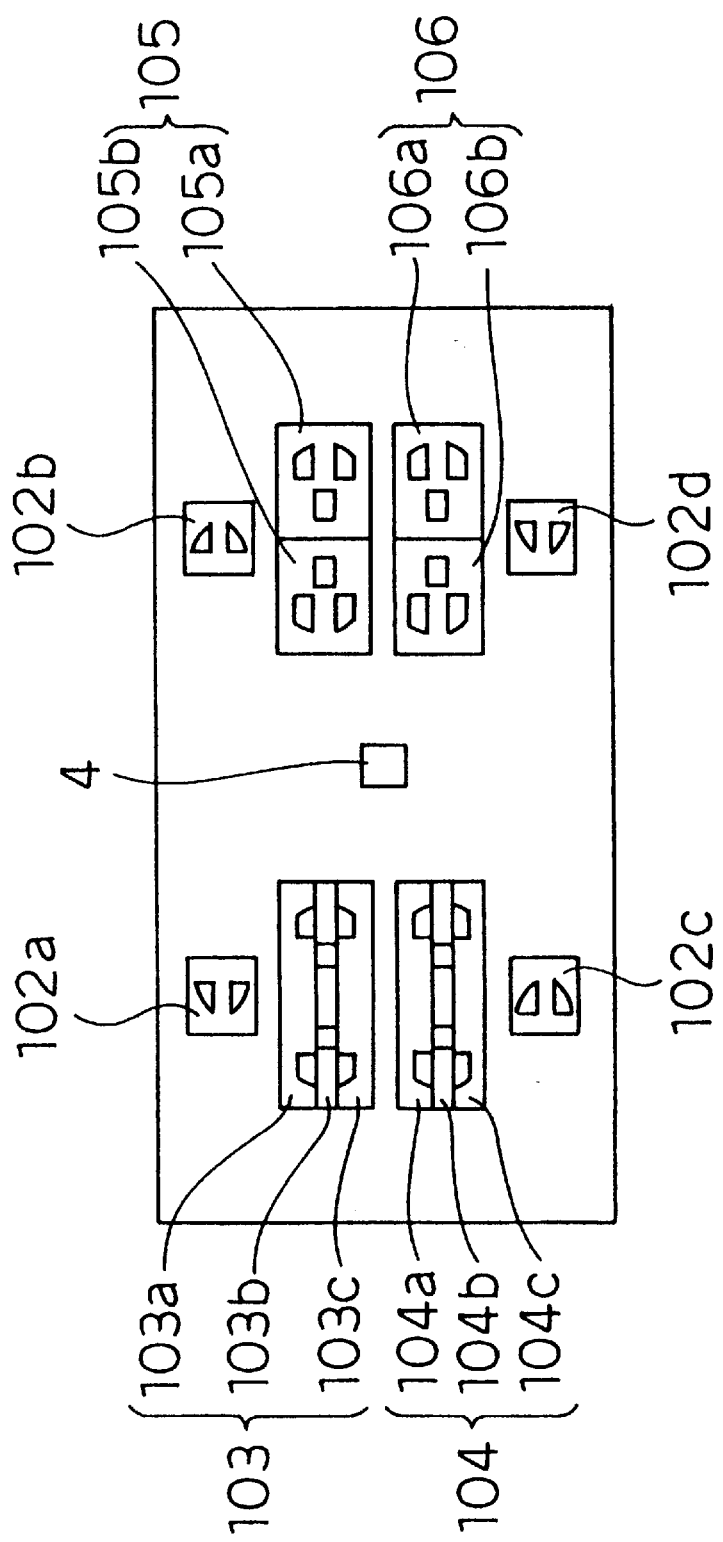
FIG. 11 shows a layout of light-receiving elements according to an eleventh embodiment of this invention.

FIG. 11 is a top view showing a layout of light-emitting and light-receiving elements according to an eleventh embodiment. This embodiment is similar to the ninth and tenth embodiments, so only the part of the configuration of the composite diffraction element which is different from those of these embodiments is described with reference to FIG. 9(*a*).

Figure 9:
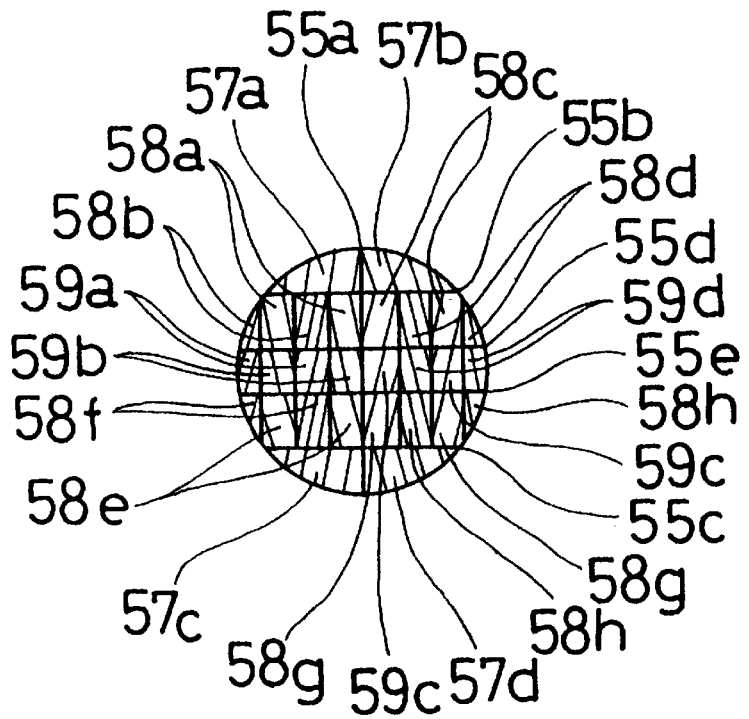
FIG. 9(a) is a top view describing a layout of composite diffraction elements and light-receiving elements according to a ninth embodiment of this invention.
FIG. 9(b) is a top view showing a layout of light-emitting and light-receiving elements according to this embodiment.
Figure 9:
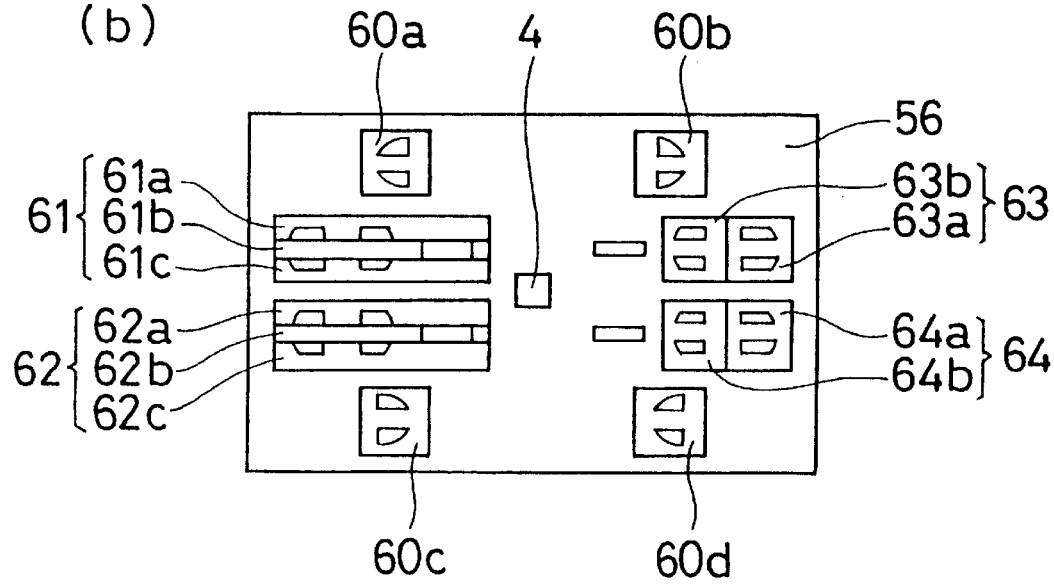

In the composite diffraction element in FIG. 9(*a*), the diffraction angle of the diffraction grating formed inside the four assemblies of band-like divisions between the parting lines 55*d* and 55*e* is different from that in the tenth embodiment. This diffraction angle is discussed in the description of the operation of this invention.

In FIG. 11, 101 is a substrate on which light-emitting and light-receiving elements are arranged; 102*a* to 102*d* are unitary light-receiving elements; 103 and 104 are three-piece light-receiving elements; 105 and 106 are two-piece light-receiving elements; and 103*a* to 103*c*, 104*a* to 104*c*, 105*a* and 105*b*, and 106*a* and 106*b* are light-receiving areas each constituting the three-piece or two-piece light-receiving element. The graphics shown inside each light-receiving element schematically show the shape of a luminous flux incident on the element.

The operation of the optical head of the above configuration is described below. Since it also has many characteristics in common with the ninth and tenth embodiments, only different features are explained. A luminous flux reflected by the optical disc and again entering the composite diffraction element is divided into a positive and a negative first order diffracted beams through the areas divided by the five parting lines 55a to 55e, and the diffracted beams travel toward the corresponding light-receiving elements. Diffracted beams through the areas 57a and 57c are incident on, for example, the light-receiving elements 102a and 102d, and diffracted beams through the areas 57b and 57d are incident on, for example, the light-receiving elements 102b and 102c. In addition, diffracted beams through the assembly of band-like divisions 58a are incident on, for example, the three-piece light-receiving element 104 and light-receiving area 105b, diffracted beams through the assembly of band-like divisions 58b are incident on, for example, the three-piece light-receiving element 103 and light-receiving area 106a, diffracted beams through the assembly of band-like divisions 58c are incident on, for example, the three-piece light-receiving element 103 and light-receiving area 106b, diffracted beams through the assembly of band-like divisions 58d are incident on, for example, the three-piece light-receiving element 104 and light-receiving area 105a, diffracted beams through the assembly of band-like divisions 58e are incident on, for example, the three-piece light-receiving element 104 and light-receiving area 105b, diffracted beams through the assembly of band-like divisions 58f are incident on, for example, the three-piece light-receiving element 103 and light-receiving area 106a, diffracted beams through the assembly of band-like divisions 58g are incident on, for example, the three-piece light-receiving element 103 and light-receiving area 106b, and diffracted beams through the assembly of band-like divisions 58h are incident on, for example, the three-piece light-receiving element 104 and light-receiving area 105a. In addition, diffracted beams through the assembly of band-like divisions 59a are incident on the three-piece light-receiving element 103 and light-receiving area 106a, diffracted beams through the assembly of band-like divisions 59b are incident on the three-piece light-receiving element 104 and light-receiving area 105a, diffracted beams through the assembly of band-like divisions 59c are incident on the three-piece light-receiving element 103 and light-receiving area 106b, and diffracted beams through the assembly of band-like divisions 59d are incident on the three-piece light-receiving element 104 and light-receiving area 105b. Thus, as in the ninth and tenth embodiments, a focus error signal FE is obtained by the following operation:

$$FE=103b+104a+104c-(103a+103c+104b) \quad \text{[Equation 49]}$$

In addition, as described above, a signal TE1 for correcting a tracking error signal offset is obtained by the following equation:

$$TE1=102a+102d-(102b+102c) \quad \text{[Equation 50]}$$

A push pull signal TE2 is obtained by detecting the differential between detection signals for luminous fluxes passing through the assemblies of band-like divisions 58a, 58b, 58e, and 58f located to the left of the area parting line 55a of the composite diffraction element and detection signals for luminous fluxes passing through the assemblies of band-like divisions 58c, 58d, 58g, and 58h located to the right of the area parting line 55a. Thus, this signal TE2 is determined by the following operation:

$$TE2=105b+106a-(105a+106b) \quad \text{[Equation 51]}$$

In this case, in the area other than the areas used to detect a push pull signal, that is, in the four assemblies of band-like divisions 59a to 59d between the area parting lines 55d and 55e of the composite diffraction element, the light-receiving area that is the term having a positive sign in Equation 51 receives diffracted beams from the assemblies of band-like divisions 59a and 59d located on the respective sides of the parting line 55a, and the light-receiving area that is the term having a negative sign receives diffracted luminous fluxes from the assemblies of band-like divisions 59b and 59c located on the respective sides of the parting line 55a. If there are a sufficiently large number of band-like divisions, this band-like division becomes equivalent to amplitude division. Consequently, the luminous flux passing between the area parting lines 55d and 55e is spatially evenly divided into two beams, which are then evenly incident on the light-receiving areas that are the terms having positive and negative signs in Equation 51, respectively. As a result, the effect of these luminous fluxes is offset by the differential detection in Equation 51.

A tracking error signal TE in which an offset is corrected that is caused by the movement of the objective is expressed as follows:

$$TE=TE2-k*TE1 \quad \text{[Equation 52]}$$

wherein (k) is a correction coefficient. In the above four equations, the detection signal names are represented by the light-receiving area names.

The signal detection method according to this embodiment sets the diffraction angle of the composite diffraction element and the layout of the light-receiving elements so as to allow the luminous flux passing between the parting lines 55d and 55e evenly to enter the light-receiving elements that detect a push pull signal, as in the above tenth embodiment. This signal detection, however, is characterized in that the luminous fluxes on the light-receiving elements are allowed to have the same shape so that despite spread caused by diffraction, each luminous flux incident on the three-piece light-receiving element has a similar distribution of the amount of light. Thus, even if a luminous flux is modulated when the light spot traverses the tracks, that modulation is evenly received by each light-receiving area so the focus error signal is unlikely to be affected by the modulation.

In this configuration, as in the seventh embodiment, when the interval between the parting lines 55b and 55c of the composite diffraction element is designated as V, Equation 11 is desirably met, and when the interval between the parting lines 55d and 55e is indicated as W, Equation 36 is desirably met.

The above optical head according to this embodiment provides not only the effects of the tenth embodiment but also a focus error signal into which few modulation components are mixed while the light spot is traversing the tracks.

Twelfth Embodiment

Figure 12:
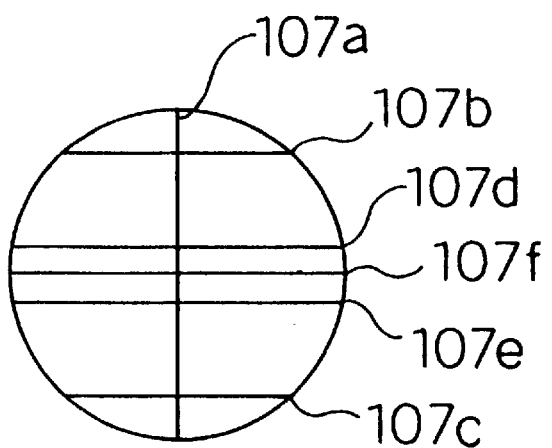
FIG. 12(a) is a top view describing a composite diffraction element according to a twelfth embodiment of this invention.
FIG. 12(b) is a conceptual drawing of an assembly of band-like divisions between parting lines 107d and 107e in FIG. 12(a).
Figure 12:
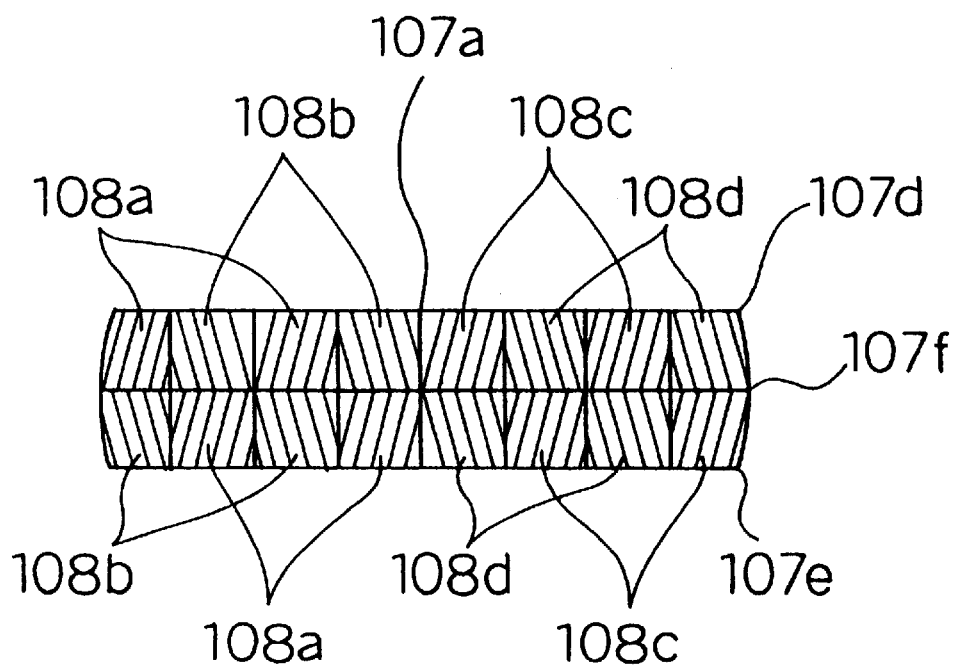

FIG. 12(a) is a conceptual top view describing a composite diffraction element according to a twelfth embodiment of this invention. FIG. 12(b) is a conceptual drawing of assemblies of band-like divisions between parting lines 107d and 107e in FIG. 12(a). Since this embodiment is obtained by changing the configuration of the assemblies of band-like divisions according to the tenth or eleventh embodiment, its configuration is described.

In FIG. 12(a), 107a to 107f are area parting lines of a composite diffraction element. Since this composite diffraction element has many characteristics in common with the element in FIG. 9(a), its configuration is omitted from FIG. 12(a) except for the area parting lines, and the configuration of assemblies of band-like divisions between the parting lines 107d and 107e that is different from that in the tenth and eleventh embodiments is shown in FIG. 12(b). In FIG. 12(b), 107a, 107d, 107e, and 107f are area parting lines of the composite diffraction element, and 108a to 108d are divided areas wherein the stripes inside each area conceptually show the direction of the diffraction grating. The areas 108a to 108d comprise four assemblies of band-like divisions formed by dividing the portion between the parting lines 107d and 107e into a plurality of band-like divisions parallel to the parting line 107a and further dividing these divisions into halves at the parting line 107f in such a way that the upper and lower arrays of band-like divisions at the parting line 107f are offset by a single division.

A fourth parting line according to this invention corresponds to the parting line 107f, and a fifth and a sixth parting lines according to this invention correspond to the parting lines 107d and 107e.

The operation of the optical head of the above configuration is common to the tenth and eleventh embodiments and is thus omitted. The following describes only the correspondence between the assemblies of band-like divisions between the parting lines 107d and 107e and the assemblies of band-like divisions in the two preceding embodiments.

For example, the areas 108a to 108d correspond to the areas 59a to 59d in FIG. 9(a). Diffracted beams through the areas 108a to 108d are incident on the predetermined light-receiving elements to provide signals as in the diffracted beams through the corresponding areas in the tenth or eleventh embodiment.

Next, the effect of the above configuration of the assemblies of band-like divisions between the parting lines 107d and 107e is explained. If the band-like divisions are formed at a sufficiently small pitch so that this division substantially becomes equivalent to amplitude division, even the assemblies of band-like divisions according to the tenth or eleventh embodiment will pose no problem. In an actual configuration of an optical head, however, the distance between the composite diffraction element and the light-receiving elements may be limited to a small value to reduce the diameter of the luminous flux on the composite diffraction element, thereby preventing the size of the assemblies from being sufficiently reduced relative to the diameter of the luminous flux. FIG. 13(a) is a conceptual drawing of the assemblies of band-like divisions used to generate signals that are offset based on Equation 47, that is, the sum of the areas 59a and 59c and the sum of the areas 59b and 59d, according to the tenth embodiment. In general, the distribution of the amount of light in luminous fluxes incident on the composite diffraction element is not uniform and significantly varies in the direction perpendicular to the parting line 55a. If the composite diffraction element is composed of the assemblies of band-like divisions arranged at a larger pitch as in the conceptual drawing of FIG. 13(a), the asymmetry of the distribution of the amount of light in luminous fluxes relative to the parting line 55a results in the difference in the amount of light passing through these assemblies, thereby preventing an accurate offset based on Equation 47.

On the other hand, due to their layout having no gap in the direction perpendicular to the parting line 107a, the assemblies of band-like divisions according to this embodiment are not affected by the asymmetry of the distribution of the amount of light in luminous fluxes relative to the parting line 107a, as shown in FIG. 13(b). In addition, since the distribution of the amount of light in reflected luminous fluxes from the optical disc is generally symmetrical and is not very variable in the direction parallel to the parting line 107a, that is, the track direction, signals from the assemblies between the parting lines 107d and 107e can be accurately offset based on Equation 47. Thus, even a composite diffraction element composed of assemblies of band-like divisions arranged at a larger pitch can detect a tracking error signal intended by the tenth and eleventh embodiments.

In this configuration, as in the seventh embodiment, when the interval between the parting lines 107b and 107c of the composite diffraction element is designated as V, Equation 11 is desirably met, and when the interval between the parting lines 107d and 107e is indicated as W, Equation 36 is desirably met.

The above composite diffraction element according to this embodiment can provide the inherent performance and characteristics of the optical head according to the tenth and eleventh embodiments even if the optical head is miniaturized to reduce the distance between the composite diffraction element and the light-receiving elements.

Thirteenth Embodiment

Figure 17:
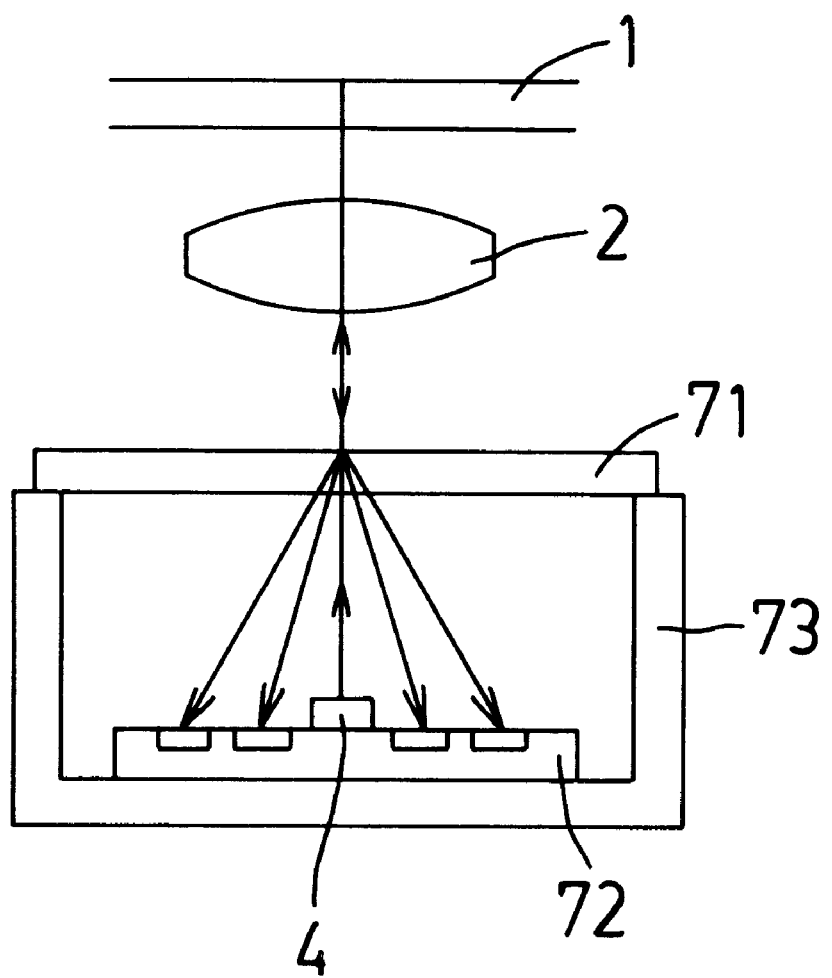
FIG. 17 shows a schematic configuration of an optical head according to a thirteenth embodiment of this invention.

FIG. 17 shows a configuration of an optical head according to a thirteenth embodiment of the invention. Since the configuration of this embodiment is similar to that of the above first embodiment, only different features are described. In FIG. 17, 71 is the composite diffraction element in each of the above embodiments according to this invention; 72 is a substrate on which the light-emitting element 4 and light-receiving elements are arranged as in the above embodiments of this invention; and 73 is a member formed of a rigid material such as metal or resin. The composite diffraction element 71 and substrate 72 are fixed together using the member 73.

The operation of the optical head of the above configuration according to this embodiment complies with each of the above embodiments, so its description is omitted.

The optical head according to this embodiment not only has the characteristics of the optical head according to each of the above embodiments, but is also characterized in that the composite diffraction element 71 and the substrate 72 on which the light-emitting and light-receiving elements are arranged are integrated into a single signal detection element. Thus, according to this embodiment, the optical head is composed of an optical system consisting of two optical parts, that is, an objective and a single signal detection element such as that described above, thereby facilitating the simplification of the assembly process and the miniaturization of the optical head.

In each of the above embodiments, the areas of the composite diffraction element correspond to the respective light-receiving elements receiving diffracted beams from the areas, as described above. Similar signal detection can be achieved with different combinations simply by changing the layout of the light-receiving elements and the diffraction grating pattern inside each area of the composite diffraction element.

In addition, a general principle is known that if interference fringes are generated by allowing two luminous fluxes, for example, a first and a second luminous fluxes to interfere with each other and when the luminous flux is incident that has the same convergence or divergence state as the first luminous flux, a diffraction element having such interference fringes as a diffraction grating pattern generates in the same direction as in the second luminous flux, a diffracted flux having the same wave front as in the second luminous flux.

Thus, in each of the above embodiments, diffracted luminous fluxes with little ray aberration are obtained by using as the diffraction grating pattern inside each area of the composite diffraction element, an interference fringe pattern generated on a surface in which the diffraction grating is formed, by means of two beams interference including a spherical wave converging toward the neighborhood of the light-emitting element and a spherical wave converging toward a predetermined position.

Alternatively, in each of the above embodiments, diffracted luminous fluxes with little ray aberration are obtained by using as the diffraction grating pattern inside each area of the composite diffraction element, an interference fringe pattern generated on a surface in which the diffraction grating is formed, by means of two beams interference including a spherical wave diverging from the neighborhood of the light-emitting element and a spherical wave diverging from a predetermined position.

In addition, using the above optical head according to this invention, a control circuit for providing control based on signals from the optical head, and a drive section for executing mechanical driving based on control signals from the control circuit, a more excellent information recording and reproduction apparatus, for example, a more excellent optical disc apparatus can be realized.

As described above, this invention can provide a stable optical head of a simple configuration that can reduce an offset in the tracking error signal caused by the movement of the objective in the tracking direction or the inclination of the information-recording medium in the radial direction.

What is claimed is:

1. An optical head comprising:
   a light-emitting element;
   a plurality of light-receiving elements;
   an objective that converges light from said light-emitting element onto a
   surface of an information-recording medium;
   a diffraction element located in an optical path between said light-emitting element and said objective to spatially divide a luminous flux into a plurality of luminous fluxes to guide the plurality of luminous fluxes to said plurality of light-receiving elements, said luminous flux reflected by said information-recording medium; and
   signal generation means for generating a focus error signal and a tracking error signal;
   wherein said diffraction element has six areas divided by a first parting line substantially parallel to a direction of information tracks of said information-recording medium and second and third parting lines substantially orthogonal to the first parting line, and
   said signal generation means (1) generates said focus and tracking error signals based on detection signals from said light-receiving elements resulting from luminous fluxes passing through two of said six areas, said two areas located between said second and third parting lines and (2) generates an offset correction signal correcting an offset caused by movement of said objective based on detection signals from said light-receiving elements resulting from luminous fluxes passing through four of said six areas, said four areas located outside said second and third parting lines.

2. An optical head according to claim 1; wherein a diffraction grating pattern formed inside each area of said diffraction element is an interference fringe pattern generated on a surface in which the diffraction grating is formed when a spherical wave converging toward the neighborhood of said light-emitting element and a spherical wave converging toward a predetermined position interfere with each other.

3. An optical head according to claim 1; wherein a diffraction grating pattern formed inside each area of said diffraction element is an interference fringe pattern generated on a surface in which the diffraction grating is formed when a spherical wave diverging from the neighborhood of said light-emitting element and a spherical wave diverging from a predetermined position interfere with each other.

4. An optical head according to claim 1 wherein said two areas between said second and third parting lines are each formed of a diffraction grating pattern so that luminous fluxes passing through these two areas are divided into four luminous fluxes as positive and negative first order diffracted beams, and wherein:
   said signal generation means generates said focus error signal based on detection signals from said light-receiving elements that receive two of these four luminous fluxes while generating said tracking error signal based on detection signals from said light-receiving elements that receive the two other luminous fluxes.

5. An optical head according to claim 1 wherein said two areas between said second and third parting lines are each formed of a diffraction grating pattern so that luminous fluxes passing through these two areas is divided into four luminous fluxes as positive and negative first order diffracted beams, wherein:
   said four divided luminous fluxes are received by the corresponding light-receiving elements, at least two of which have a light-receiving area divided into three, and wherein:
   said focus and tracking error signals are generated based on signals detected by said four light-receiving elements.

6. An optical head according to claim 1 wherein said composite diffraction element has eight areas divided by a first parting line substantially parallel to the direction of information tracks of said information-recording medium, a second and a third parting lines substantially orthogonal to the first parting line and substantially symmetrical relative to the optical axis of said objective, and a fourth parting line parallel to the second and third parting lines and located at an equal distance from them, and wherein:
   said signal generation means (1) generates said focus error and tracking error signals based on detection signals from said light-receiving elements for luminous fluxes resulting from passage through those four of said eight areas, said four areas being located between said second and third parting lines and (2) generates an offset correction signal that corrects an offset in the tracking error signal caused by the movement of said objective, based on detection signals from said light-receiving elements for luminous fluxes resulting from passage through those four of said eight areas, said four areas being located outside said second and third parting lines, in order to use said generated offset correction signal in generating said tracking error signal.

7. An optical head according to claim 6 wherein said four areas between said second and third parting lines are each formed of a diffraction grating pattern so that luminous fluxes passing through these four areas is divided into eight luminous fluxes as positive and negative first order diffracted beams, and wherein:

said signal generation means generates said focus error signal based on detection signals from said light-receiving elements that receive four of the eight luminous fluxes while generating said tracking error signal based on detection signals from said light-receiving elements that receive the four other luminous fluxes.

8. An optical head according to claim 7 wherein said eight luminous fluxes resulting from passage through said four areas between said second and third parting lines are received by the said corresponding light-receiving elements, two of which are a first and a second two-piece light-receiving elements having a light-receiving area divided into two, while the other light-receiving elements are a third to a sixth light-receiving elements, wherein:

the diffraction grating patterns inside said two areas between said second and fourth parting lines are formed so that luminous fluxes passing through said two areas between said second and fourth parting lines are divided into four luminous fluxes as positive and negative first order diffracted beams, two of which are incident on said first two-piece light-receiving element at different positions of the parting line while the two other luminous fluxes are incident on said third and fourth light-receiving elements, respectively, wherein:

the diffraction grating patterns inside said two areas between said third and fourth parting lines are formed so that luminous fluxes passing through said two areas between said third and fourth parting lines are divided into four luminous fluxes as positive and negative first order diffracted beams, two of which are incident on said second two-piece light-receiving element at different positions of the parting line while the two other luminous fluxes are incident on said fifth and sixth light-receiving elements, respectively, and wherein:

said focus error signal is generated based on detection signals from said first and second two-piece light-receiving elements, while said tracking error signal is generated based on detection signals from the four light-receiving elements including said third to sixth light-receiving elements.

9. An optical head according to claim 8 wherein the four light-receiving elements including said third to sixth light-receiving elements are replaced by two light-receiving elements having equivalent light-receiving areas, and wherein:

the diffraction grating patterns inside the four areas between the second and third parting lines of said composite diffraction element are formed so that a push pull signal is detected by a differential operation on signals for beams received by the two light-receiving elements.

10. An optical head according to claim 8 wherein in addition to said four areas between said second and third parting lines, said composite diffraction element has two areas divided by said fourth parting line and a fifth and a sixth parting lines symmetrical relative to said fourth parting line, and wherein:

the diffraction grating patterns inside the areas between said fifth and sixth parting lines are formed and said light-receiving elements are located so that:

a plurality of luminous fluxes resulting from passage through said two areas are received by the light-receiving elements that detect said focus error signal but not received by the light-receiving elements for generating said tracking error signal.

11. An optical head according to claim 8 wherein in addition to said four areas between said second and third parting lines, said composite diffraction element has two areas divided by said fourth parting line and a fifth and a sixth parting lines symmetrical relative to said fourth parting line, and wherein:

the diffraction grating patterns inside the two areas between said fifth and sixth parting lines are configured so that luminous fluxes resulting from passage through the areas between said fourth and fifth parting lines and luminous fluxes resulting from passage through the areas between said fourth and sixth parting lines are evenly received by a pair of light-receiving elements to detect a push pull signal.

12. An optical head according to claim 1 wherein the two areas between said second and third parting lines each have a plurality of band-like divisions, wherein:

(1) a set of the band-like divisions alternately arranged in one of said two areas is designated as a first assembly of band-like divisions, while a set of the remaining band-like divisions is designated as a second assembly of band-like divisions, and (2) a set of the band-like divisions alternately arranged in the other area is designated as a third assembly of band-like divisions, while a set of the remaining band-like divisions is designated as a fourth assembly of band-like divisions, wherein:

said plurality of light-receiving elements include a first and a second three-piece light-receiving elements that each receive diffracted beams from the first to fourth assemblies of band-like divisions and a third to a sixth light-receiving elements, wherein:

the diffraction grating patterns inside the areas of said first and fourth assemblies of band-like divisions are formed so that:

(1) a luminous flux passing through said first assembly of band-like divisions is divided into two luminous fluxes as positive and negative first order diffracted beams, while a luminous flux passing through said fourth assembly of band-like divisions is divided into two luminous fluxes as positive and negative first order diffracted beams so that:

(2) (a) one of the two luminous fluxes passing through said first assembly of band-like divisions and one of the two luminous fluxes passing through said fourth assembly of band-like divisions are incident on said first three-piece light-receiving element at different positions, while (b) the other of the two luminous fluxes passing through said first assembly of band-like divisions is incident on said third light-receiving element and (c) the other of the two luminous fluxes passing through said fourth assembly of band-like divisions is incident on said fourth light-receiving element, wherein:

the diffraction grating patterns inside the areas of said second and third assemblies of band-like divisions are formed so that:

(3) a luminous flux passing through said second assembly of band-like divisions is divided into two luminous fluxes as positive and negative first order diffracted beams, while a luminous flux passing through said third assembly of band-like divisions is divided into two luminous fluxes as positive and negative first order diffracted beams and so that:

(4) (a) one of the two luminous fluxes passing through said second assembly of band-like divisions and one of the two luminous fluxes passing through said fourth assembly of band-like divisions are incident on said second three-piece light-receiving element at different positions, while (b) the other of the two luminous fluxes passing through said second assembly of band-like divisions is incident on said fifth light-receiving element and (c) the other of the two luminous fluxes passing through said third assembly of band-like divisions is incident on said sixth light-receiving element, wherein:

said focus error signal is generated based on detection signals detected from said first and second three-piece light-receiving elements, while said tracking error signal is generated based on detection signals detected from said third to sixth light-receiving elements, and wherein:

based on signals detected on receiving diffracted beams from the four areas outside the second and third parting lines of said composite diffraction element, the offset correction signal is generated that corrects an offset in the tracking error signal caused by the movement of said objective.

13. An optical head according to claim 12 wherein the luminous fluxes incident on said first three-piece light-receiving element at the different positions extend over the three divided areas.

14. An optical head according to claim 12 wherein the luminous fluxes incident on said second three-piece light-receiving element at the different positions extend over the three divided areas.

15. An optical head according to claim 12 wherein an area sandwiched by the fifth and sixth parting lines substantially parallel to said second and third parting lines is provided between said second and third parting lines at a position at which said assemblies of band-like divisions are divided, wherein:

the area sandwiched by said fifth and sixth parting lines has a plurality of assemblies of band-like divisions in which a set of the alternately arranged band-like divisions is designated as a fifth assembly of band-like divisions while a set of the remaining band-like divisions is designated as a sixth assembly of band-like divisions, and wherein:

the light-receiving elements and the diffraction grating patterns inside the areas of said fifth and sixth assemblies of band-like divisions are configured so that luminous fluxes resulting from passage through said fifth and sixth assemblies of band-like divisions are received by the light-receiving elements that detect said focus error signal but not received by the light-receiving elements for generating said tracking error signal.

16. An optical head according to claim 12 wherein two areas sandwiched by the fifth and sixth parting lines substantially parallel to both of said second and third parting lines are provided between said second and third parting lines at positions at which said assemblies of band-like divisions are divided, wherein:

said two areas are symmetrical relative to said first parting line and each have a plurality of band-like divisions, wherein:

(1) a set of the band-like divisions alternately arranged in one of said two areas is designated as a fifth assembly of band-like divisions, while a set of the remaining band-like divisions is designated as a sixth assembly of band-like divisions, and (2) a set of the band-like divisions alternately arranged in the other area is designated as a seventh assembly of band-like divisions, while a set of the remaining band-like divisions is designated as an eighth assembly of band-like divisions, wherein:

the diffraction grating patterns inside the areas of said fifth to eighth assemblies of band-like divisions are formed so that:

(1) a luminous flux resulting from passage through said fifth assembly of band-like divisions and a luminous flux resulting from passage through said seventh assembly of band-like divisions are received by one of the light-receiving elements that detect a push pull signal, while (2) a luminous flux resulting from passage through said sixth assembly of band-like divisions and a luminous flux resulting from passage through said eighth assembly of band-like divisions are received by the other of the light-receiving elements that detect said push pull signal.

17. An optical head according to claim 16 wherein the area sandwiched by said fifth and sixth parting lines is further divided into two by a fourth parting line substantially parallel to both of said fifth and sixth parting lines, and wherein:

the array of the band-like divisions in one of the two divided areas is offset from the array of the band-like divisions in the other area.

18. An optical head according to claim 1; wherein when the diameter of a passing luminous flux is designated as D, the numerical aperture of an objective on said information-recording medium side is designated as NA, the wavelength is designated as $\lambda$, the pitch of information tracks is designated as d, and the interval between the second and third parting lines is designated as V, the luminous-flux division in said composite diffraction element satisfies the following equation:

$$0.8\sqrt{1 - \frac{1}{4}\left(\frac{\lambda}{NA \times d}\right)^2} < \frac{V}{D} < 1.2\sqrt{1 - \frac{1}{4}\left(\frac{\lambda}{NA \times d}\right)^2} \quad \text{[Equation 1]}$$

19. An optical head according to claim 4; wherein when the diameter of a passing luminous flux is designated as D, the numerical aperture of an objective on said information-recording medium side is designated as NA, the wavelength is designated as $\lambda$, the pitch of information tracks is designated as d, and the interval between the second and third parting lines is designated as V, the luminous-flux division in said composite diffraction element satisfies the following equation:

$$0.8\sqrt{1 - \frac{1}{4}\left(\frac{\lambda}{NA \times d}\right)^2} < \frac{V}{D} < 1.2\sqrt{1 - \frac{1}{4}\left(\frac{\lambda}{NA \times d}\right)^2} \quad \text{[Equation 1]}$$

20. An optical head according to claim 6; wherein when the diameter of a passing luminous flux is designated as D, the numerical aperture of an objective on said information-recording medium side is designated as NA, the wavelength is designated as $\lambda$, the pitch of information tracks is designated as d, and the interval between the second and third parting lines is designated as V, the luminous-flux division in said composite diffraction element meets the following equation:

$$0.8\sqrt{1-\frac{1}{4}\left(\frac{\lambda}{NA \times d}\right)^2} < \frac{V}{D} < 1.2\sqrt{1-\frac{1}{4}\left(\frac{\lambda}{NA \times d}\right)^2} \quad \text{[Equation 1]}$$

21. An optical head according to claim 10; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

22. An optical head according to claim 11; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

23. An optical head according to claim 15; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

24. An optical head according to claim 16; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

25. An optical head according to claim 18; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

26. An optical head according to claim 19; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

27. An optical head according to claim 20; wherein when the interval between said fifth and sixth parting lines is designated as W, the numerical aperture of an objective on said information medium side is designated as NA, the wavelength is designated as λ, the pitch of information tracks is designated as d, and the diameter of a luminous flux on the composite diffraction element is designated as D, the luminous-flux division in said composite diffraction element meets the following equation:

$$0.12\sqrt{1-\frac{1}{4}\left(\frac{\lambda}{NA \times d}\right)^2} < \frac{W}{D} < 0.5\sqrt{1-\frac{1}{4}\left(\frac{\lambda}{NA \times d}\right)^2} \quad \text{[Equation 2]}$$

28. An optical head according to claim 1; wherein said light-emitting element and said plurality of light-receiving elements are arranged on the same substrate, and wherein:
    said composite diffraction element is integrally fixed to said substrate at a predetermined interval therefrom.

29. An information recording and reproduction apparatus comprising:
    an optical head including
        a light-emitting element;
        a plurality of light-receiving elements;
        an objective that converges light from said light-emitting element onto a
        surface of an information-recording medium;
    a diffraction element located in an optical path between said light-emitting element and said objective to spatially divide a luminous flux into a plurality of luminous fluxes to guide the plurality of luminous fluxes to said plurality of light-receiving elements, said luminous flux reflected by said information-recording medium; and
    signal generation means for generating a focus error signal and a tracking error signal;
    wherein said diffraction element has six areas divided by a first parting line substantially parallel to a direction of information tracks of said information-recording medium and second and third parting lines substantially orthogonal to the first parting line, said signal generation means (1) generates said focus and tracking error signals based on detection signals from said light-receiving elements resulting from luminous fluxes passing through two of said six areas, said two areas located between said second and third parting lines and (2) generates an offset correction signal correcting an offset caused by movement of said objective based on detection signals from said light-receiving elements resulting from luminous fluxes passing through four of said six areas, said four areas located outside said second and third parting lines;

a control circuit provides control based on a signal from the optical head; and a drive section provides mechanical driving based on a control signal from the control circuit.

* * * * *